United States Patent
Matsui et al.

(10) Patent No.: US 12,436,339 B2
(45) Date of Patent: Oct. 7, 2025

(54) OPTICAL TRANSCEIVER, OPTICAL TRANSCEIVER DEVICE USING THE SAME, AND METHOD OF CONTROLLING LIGHT SOURCE WAVELENGTHS

(71) Applicant: Fujitsu Limited, Kawasaki (JP)

(72) Inventors: Jun Matsui, Kawasaki (JP); Tomoyuki Akiyama, Yokohama (JP); Shinsuke Tanaka, Hiratsuka (JP)

(73) Assignee: Fujitsu Limited, Kawasaki (JP)

(*) Notice: Subject to any disclaimer, the term of this patent is extended or adjusted under 35 U.S.C. 154(b) by 269 days.

(21) Appl. No.: 18/224,654

(22) Filed: Jul. 21, 2023

(65) Prior Publication Data

US 2024/0094470 A1    Mar. 21, 2024

(30) Foreign Application Priority Data

Sep. 20, 2022  (JP) .................. 2022-149338

(51) Int. Cl.
  *G02B 6/293*  (2006.01)
  *H04B 10/40*  (2013.01)
  (Continued)

(52) U.S. Cl.
  CPC .......... *G02B 6/2935* (2013.01); *H04B 10/40* (2013.01); *H04B 10/501* (2013.01);
  (Continued)

(58) Field of Classification Search
  CPC ............... G02B 6/2935; H04B 10/501; H04B 10/5057; H04B 10/506; H04B 10/572;
  (Continued)

(56) References Cited

U.S. PATENT DOCUMENTS 6,426,832 B1    7/2002  Kinoshita
2005/0286909 A1*  12/2005  Kish, Jr. ............ H04B 10/50
                                                    398/196

(Continued)

FOREIGN PATENT DOCUMENTS

JP        9-261181 A    10/1997
JP    2006-304354 A    11/2006
(Continued)

*Primary Examiner* — Leslie C Pascal
(74) *Attorney, Agent, or Firm* — STAAS & HALSEY LLP

(57) ABSTRACT

An optical transceiver includes: an optical transceiver circuit; a light source device to multiplex light rays emitted from light source elements having different wavelengths, and output multiplexed light; a demultiplexer to demultiplex the light output from the light source device into wavelengths to supply the wavelengths to the optical transceiver circuit; monitors to monitor the wavelengths at output ports of the demultiplexer, respectively; and a wavelength controller to control the wavelengths of the light source elements, based on monitoring results of the monitors, wherein the demultiplexer includes unit circuits in each of which three asymmetric Mach-Zehnder interferometers having a predetermined arm length difference are cascaded in a tree shape, and each of the monitors is arranged at an output waveguide of an asymmetric Mach-Zehnder interferometer at an end of the cascaded tree, to be connected to the wavelength controller via a signal line.

13 Claims, 28 Drawing Sheets

(51) Int. Cl.
*H04B 10/50* (2013.01)
*H04B 10/572* (2013.01)
*H04J 14/02* (2006.01)

(52) U.S. Cl.
CPC ....... *H04B 10/5057* (2013.01); *H04B 10/506* (2013.01); *H04B 10/572* (2013.01); *H04J 14/0307* (2023.08)

(58) Field of Classification Search
CPC .. H04B 10/40; H04J 14/0307; H04J 14/0256; H04J 14/0298
See application file for complete search history.

(56) References Cited

U.S. PATENT DOCUMENTS

| | | | |
|---|---|---|---|
| 2019/0097732 A1* | 3/2019 | Akiyama | G02B 6/29395 |
| 2019/0245642 A1 | 8/2019 | Akiyama | |
| 2020/0379181 A1* | 12/2020 | Akiyama | H04J 14/0282 |

FOREIGN PATENT DOCUMENTS

| | | |
|---|---|---|
| JP | 2016-225923 A | 12/2016 |
| JP | 2019-135524 A | 8/2019 |

* cited by examiner

OPTICAL TRANSCEIVER, OPTICAL TRANSCEIVER DEVICE USING THE SAME, AND METHOD OF CONTROLLING LIGHT SOURCE WAVELENGTHS

CROSS-REFERENCE TO RELATED APPLICATIONS

The present application is based upon and claims the benefit of priority of Japanese Patent Application No. 2022-149338 filed on Sep. 20, 2022, the entire contents of which are hereby incorporated by reference.

FIELD

The present disclosure relates to an optical transceiver, an optical transceiver device using the same, and a method of controlling light source wavelengths.

BACKGROUND

As one of methods of increasing communication capacity, there has been WDM (Wavelength Division Multiplexing) for multiplexing light rays of a number of wavelengths. In the WDM, multiple channels assigned to multiple optical transceiver modules are multiplexed and transmitted on one optical fiber, to increase the communication capacity. In order to increase the use efficiency of an optical spectrum, dense WDM in which a number of wavelengths are densely multiplexed with narrow spacing has also been put to practical use. On the reception side of an optical transceiver module, light including multiplexed wavelengths is demultiplexed using a demultiplexer (see, e.g., Patent Documents 1 and 2). A configuration of a demultiplexer has been proposed in which multiple 3.5 unit circuits each formed of three asymmetric Mach-Zehnder (AMZ) interferometers having the same arm length difference are connected (see, e.g., Patent Document 3).

Meanwhile, subcarrier transmission has been known in which frequency multiplexing is executed between a set of optical transceiver modules by using multiple subcarriers. In subcarrier transmission, a technique is required for controlling wavelengths to have uniform spacing, so as to have the subcarriers precisely demultiplexed by an optical transceiver on the reception side.

RELATED ART DOCUMENTS

Patent Documents

[Patent Document 1] Japanese Laid-Open Patent Application No. 1997-261181
[Patent Document 2] Japanese Laid-Open Patent Application No. 2016-225923
[Patent Document 3] Japanese Laid-Open Patent Application No. 2019-135524

In a transceiver of a subcarrier transmission scheme, a light source device having multiple laser elements that output light rays having different wavelengths is used. In order to control the wavelength spacing to be dense, and to be uniform spacing by using the laser elements corresponding to the number of subcarriers, a wavelength monitor or a wavelength locker is provided for each laser element, the size of the light source device increases in proportion to the number of subcarriers to be multiplexed, and the size and cost of the optical transceiver increase. In an aspect in the present disclosure, it is an object improve the use efficiency of frequencies, and as well, to suppress increase in the size and cost of an optical transceiver.

SUMMARY

According to an aspect in the present disclosure, an optical transceiver includes:
an optical transceiver circuit;
a light source device configured to multiplex light rays emitted from a plurality of light source elements having different wavelengths, and output multiplexed light;
a demultiplexer configured to demultiplex the light output from the light source device into a plurality of wavelengths to supply the wavelengths to the optical transceiver circuit;
a plurality of monitors configured to individually monitor any one of the plurality of wavelengths at output ports of the demultiplexer; and
a wavelength controller including processing circuitry configured to control the wavelengths of the plurality of light source elements, based on monitoring results of the monitors,
wherein the demultiplexer includes a plurality of unit circuits in each of which three asymmetric Mach-Zehnder interferometers having a predetermined arm length difference are connected in a tree shape, the plurality of unit circuits being cascaded in the tree shape, and each of the monitors being arranged at an output waveguide of an asymmetric Mach-Zehnder interferometer at an end of the cascaded tree, to be connected to the wavelength controller via a signal line.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

DESCRIPTION OF EMBODIMENTS

Figure 1:
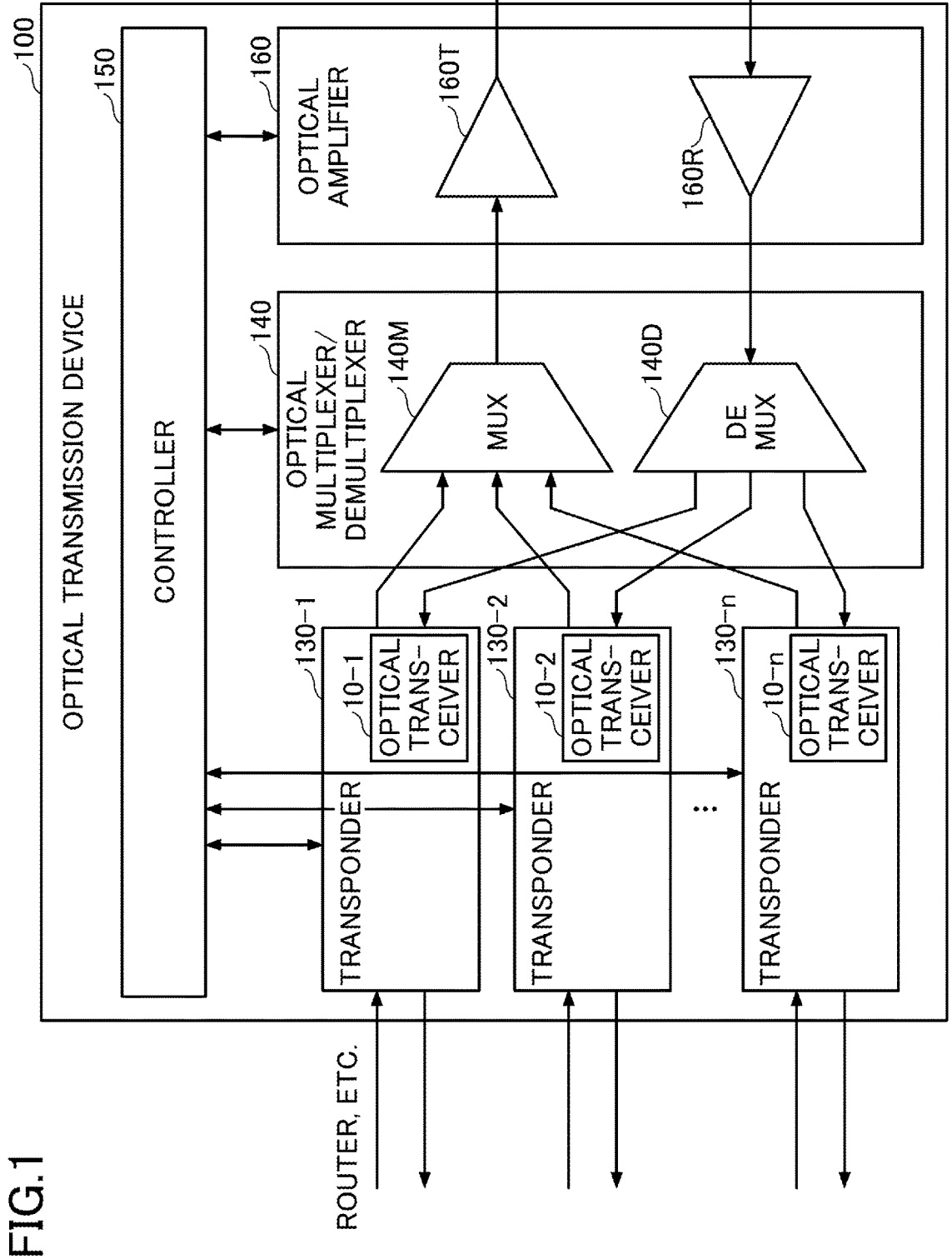
FIG. 1 is a schematic diagram of an optical transmission device to which the present disclosure is applied.

According to the present disclosure, the use efficiency of frequencies can be improved, and as well, increase in the size and cost of the optical transceiver can be suppressed. FIG. 1 is a schematic diagram of an optical transmission device 100 to which the present disclosure is applied. The optical transmission device 100 is used as, for example, a network node of a WDM transmission system. The optical transmission device 100 includes multiple transponders 130-1 to 130-$n$ (collectively referred to as "transponder(s) 130" as appropriate), an optical multiplexer/demultiplexer 140, an optical amplifier 160, and a controller 150. The controller 150 is implemented with a processor and a memory to control operations of the transponders 130, the optical multiplexer/demultiplexer 140, and the optical amplifier 160. The transponder 130 is, for example, a transponder for subcarrier transmission, and is an example of an optical transceiver device.

Signals from a client device such as a router are converted into frame formats for optical transmission at the respective transponders 130-1 to 130-$n$, and subcarrier signals including multiple subcarriers are generated at corresponding optical transceivers 10-1 to 10-$n$ (collectively referred to as "optical transceiver(s) 10" as appropriate). The subcarrier signals generated by the optical transceivers 10 are wavelength-multiplexed by a multiplexer (denoted as "MUX") 140M of the optical multiplexer/demultiplexer 140, amplified by an optical amplifier 160T, and output to a transmission path on the network side. Light received from the network is amplified by an optical amplifier 160R, and then, demultiplexed into respective channels by an optical demultiplexer (denoted as "DEMUX") 140D, to be supplied to the transponders 130. An optical signal received by each of the transponders 130 includes multiple subcarriers. The optical transceiver 10 of the transponder 130 demultiplexes the received optical signal into subcarriers to be detected.

Figure 2:
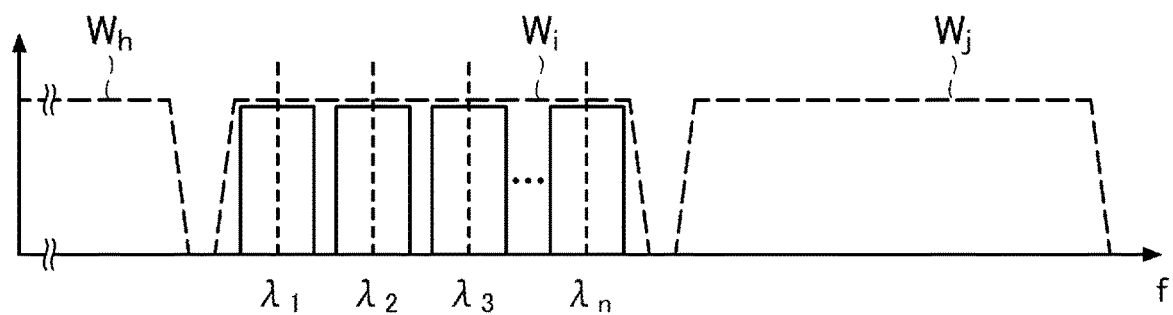
FIG. 2 is a schematic diagram illustrating an application to WDM of subcarrier transmission.

FIG. 2 is a schematic diagram illustrating an application to WDM of subcarrier transmission. A wavelength band assigned to each of the transponders 130 (or the optical transceiver 10) in WDM communication is denoted as W. Multiple subcarriers $\lambda_1, \lambda_2, \ldots,$ and $\lambda_n$ are included in one wavelength band W. Intensity modulation such as four-level pulse amplitude modulation (PAM4) has been applied to each subcarrier $\lambda_1, \lambda_2, \ldots,$ and $\lambda_n$. One optical transceiver 10 uses a wavelength band $W_i$, and another optical transceiver 10 uses an adjacent wavelength band $W_j$. Signals in a number of wavelength bands W, each of which includes multiple subcarriers $\lambda i$, are multiplexed and transmitted as a WDM signal. In the case where each subcarrier has been intensity-modulated on the transmission side, the WDM signal is demultiplexed into subcarriers with uniform wavelength spacing on the reception side, and the power is detected by an optical detector for each subcarrier.

Figure 3:
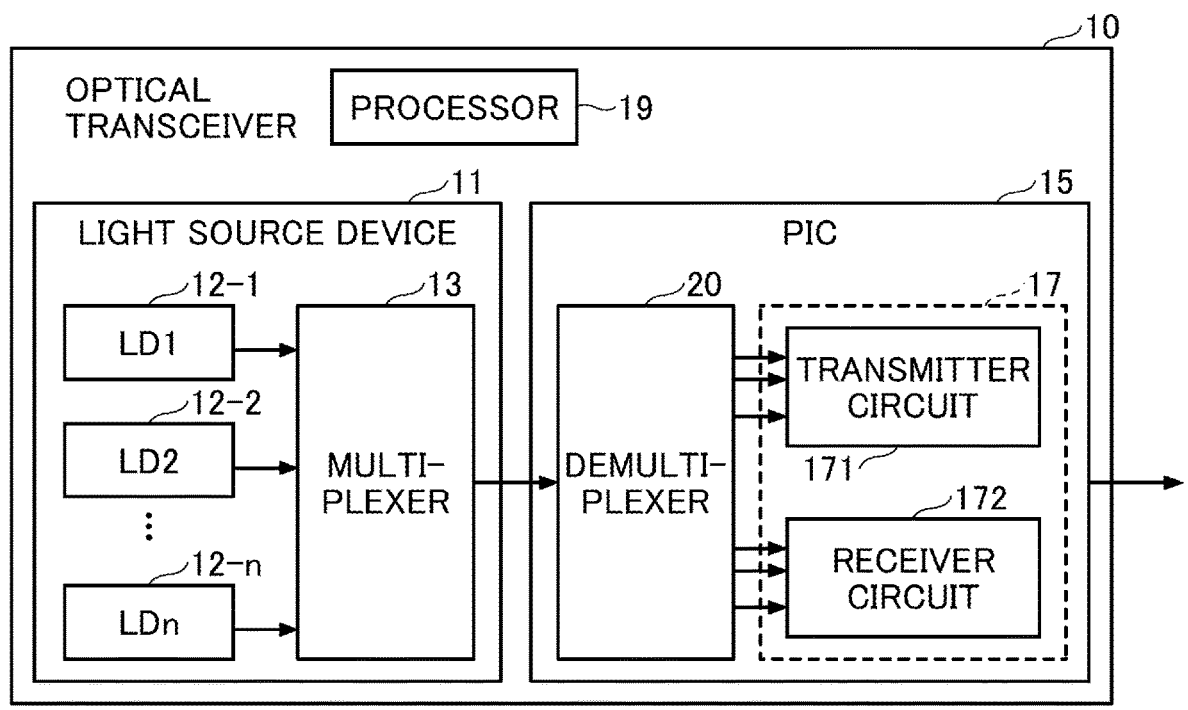
FIG. 3 is a schematic diagram of an optical transceiver of a subcarrier scheme.

FIG. 3 is a schematic diagram of an optical transceiver 10 of an embodiment. The optical transceiver includes a light source device 11, a photonic integrated circuit (PIC) 15, and a processor 19. The light source device 11 includes multiple light source elements 12-1 to 12-$n$ (collectively referred to as "light source element(s) 12" as appropriate) and a multiplexer 13. The light source element 12 is a laser diode in this example, and is denoted as "LD" in the figure. The photonic integrated circuit 15 includes a demultiplexer 20 and an optical transceiver circuit 17. The optical transceiver circuit 17 includes a transmitter circuit 171 and a receiver circuit 172. The demultiplexer 20 and the optical transceiver circuit 17 are integrated on the same substrate, for example, using silicon photonics techniques. Among light rays output from the demultiplexer 20, light rays incident on the transmitter circuit 171 are modulated and emitted as a modulated optical signal. Light rays incident on the receiver circuit 172 from the demultiplexer 20 are used as locally oscillated light (LO).

In an embodiment, when controlling the transmission characteristics of the demultiplexer 20 based on monitoring results of light rays of the respective wavelengths demultiplexed by the demultiplexer 20, the wavelengths of the respective light source elements 12 of the light source device 11 are controlled by the processor 19 by using the monitoring results. Even if the oscillation wavelengths of the multiple light source elements 12 are designed to have uniform spacing, the oscillation wavelengths often deviate from the designed oscillation wavelengths due to manufacturing variations, environmental changes, and change over the years. Therefore, in general, a wavelength monitor or a wavelength locker is provided for each light source element, to monitor and control the wavelength. In contrast, in the embodiment, by controlling the oscillation wavelength of each light source element 12 in parallel with the control of the transmission characteristics of the demultiplexer 20, uniform wavelength spacing as designed is obtained without installing a wavelength monitor or a wavelength locker for each light source element 12. When referring to uniform wavelength spacing, it does not mean strictly the same wavelength spacing, but may include an error within a range allowed for subcarrier transmission. It is important to keep the wavelength spacing uniform because the use efficiency of frequencies of subcarrier transmission is improved by densely arranging orthogonal subcarriers in a narrow band. "Orthogonality" of subcarriers is "orthogonality" in a mathematical sense that equations of signals carried by adjacent subcarriers can be combined and separated from each other, and is different from orthogonality of optical phases. In the following, a configuration in which the wavelength spacing is uniformly controlled (first embodiment), and a configuration in which the absolute values of wavelengths are controlled together with the uniform wavelength spacing (second embodiment) will be described in detail.

First Embodiment

Figure 4:
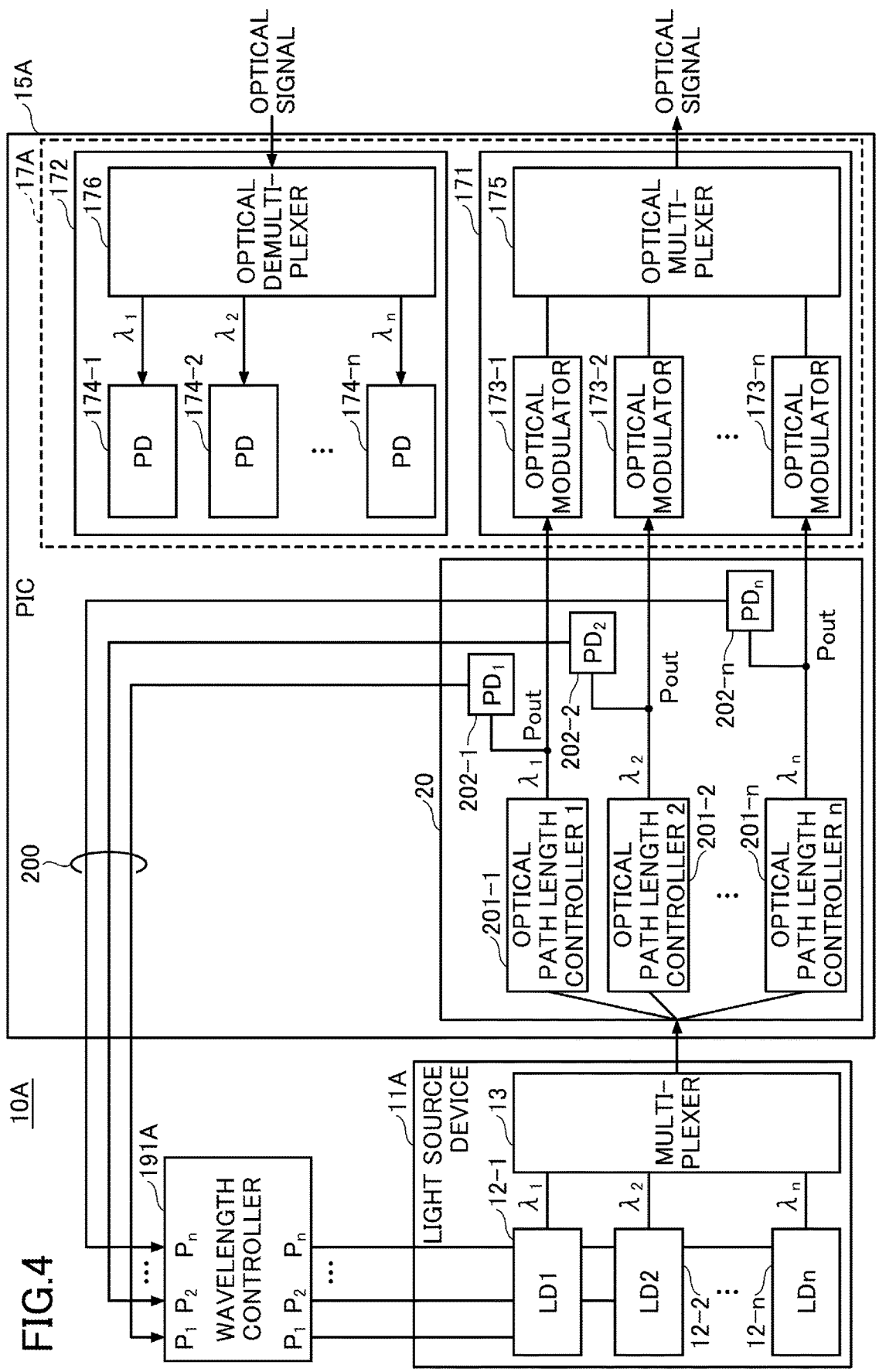
FIG. 4 is a schematic diagram of an optical transceiver of a first embodiment.

FIG. 4 is a schematic diagram of an optical transceiver 10A of the first embodiment. The optical transceiver 10A includes a light source device 11A, a photonic integrated circuit 15A, and a wavelength controller 191A. The wavelength controller 191A is implemented with functions of the processor 19. The photonic integrated circuit 15A includes a demultiplexer 20 and an optical transceiver circuit 17A. The demultiplexer 20 and the optical transceiver circuit 17A are integrated on one substrate, for example, by silicon photonics techniques. A receiver circuit 172 of the optical transceiver circuit 17A includes an optical demultiplexer 176 and multiple optical detectors (denoted as "PD" in the FIGS. 174-1, 174-2, . . . , and 174-n (collectively referred to as "optical detector(s) 174" as appropriate). A transmitter circuit 171 includes multiple optical modulators 173-1, 173-2, . . . , and 173-n (collectively referred to as "optical modulator(s) 173" as appropriate) and an optical multiplexer 175.

The light source device 11A includes n elements (where n is an integer being 2 or greater) of light source elements 12. Each light source element 12 oscillates at a different wavelength $\lambda_1, \lambda_2, \ldots$, and or $\lambda_n$. Multiple light rays having respective wavelengths are multiplexed by the multiplexer 13 such as an optical coupler, and the multiplexed light is output from the light source device 11A. The light output from the light source device 11A is incident on the photonic integrated circuit 15A. The demultiplexer 20 formed in the photonic integrated circuit 15A includes optical path length controllers 201-1, 201-2, . . . , and 201-n (collectively referred to as "optical path length controller(s) 201" as appropriate) corresponding to the number of wavelengths, and optical detectors 202-1, 202-2, . . . , and 202-n for monitoring provided at output ports Pout. The monitoring optical detectors 202-1, 202-2, . . . , and 202-n are denoted as $PD_1, PD_2, \ldots$, and $PD_n$ for the purpose of distinguishing these from the optical detectors 174 of the receiver circuit 172. In the following, the optical detectors 202-1, 202-2, . . . , and 202-n are referred to as monitors PD 202-1, 202-2, . . . , and 202-n, and may be collectively referred to as "monitor(s) PD 202" as appropriate.

The optical path length controllers 201-1 to 201-n control the effective optical path lengths of the respective optical waveguides formed in the demultiplexer 20,
The optical path length controllers 201-1 to 201-n are examples of a control mechanism configured to control effective optical path lengths or optical phases by changing the refractive indices of the optical waveguides by heating, voltage application, or the like. The control mechanism controls the transmission characteristics of the demultiplexer 20 by changing the optical phase, and demultiplexes light including the multiple wavelengths incident on the demultiplexer 20. Light rays of the respective wavelengths demultiplexed by the demultiplexer 20 are monitored by the monitors PD 202-1, 202-2, . . . , and 202-n.

The outputs of the monitors PD 202-1 to 201-n are fed back to the wavelength controller 191A via feedback signal lines 200. Monitoring results are used by the wavelength controller 191A to control the oscillation wavelengths of the light source elements 12-1 to 12-n of the light source device 11A. By using the monitoring results of the demultiplexer 20, the light source device 11A is controlled so as to make the oscillation wavelengths $\lambda_1, \lambda_2, \ldots$, and $\lambda_n$ of the light source elements 12-1 to 12-n have predetermined optical-frequency spacing. As will be described later, the control of the oscillation wavelengths of the light source devices 11A is executed in parallel with the control of the transmission characteristics of the demultiplexer 20 by the optical path length controllers 201-1 to 201-n.

In the first embodiment, light rays of the respective wavelengths emitted from the light source device 11A are intensity-modulated and transmitted by the transmitter circuit 171. On the reception side, subcarriers are demultiplexed at regular spacing to detect power; therefore, uniform wavelength spacing is required, but the absolute values of wavelengths is not required. Even if the absolute values of wavelengths is slightly deviated, the wavelength spacing is controlled to be uniform; therefore, deviation of the center wavelengths by the same amount in the same direction can be absorbed by coherent signal processing including a digital signal processor between a pair of optical transmitter and optical receiver on the opposing sides.

The control of the transmission characteristics of the demultiplexer 20 and the control of the wavelength spacing of the light source device 11A are carried out when a new transponder 130 is installed in the optical transmission device 100, or when an optical transceiver 10A or a transponder 130 is reactivated. Other than upon activation of the optical transceiver 10A, the transmission characteristics of the demultiplexer 20 and the wavelength spacing of the light source device 11A may be controlled regularly or irregularly during operation.

Figure 5:
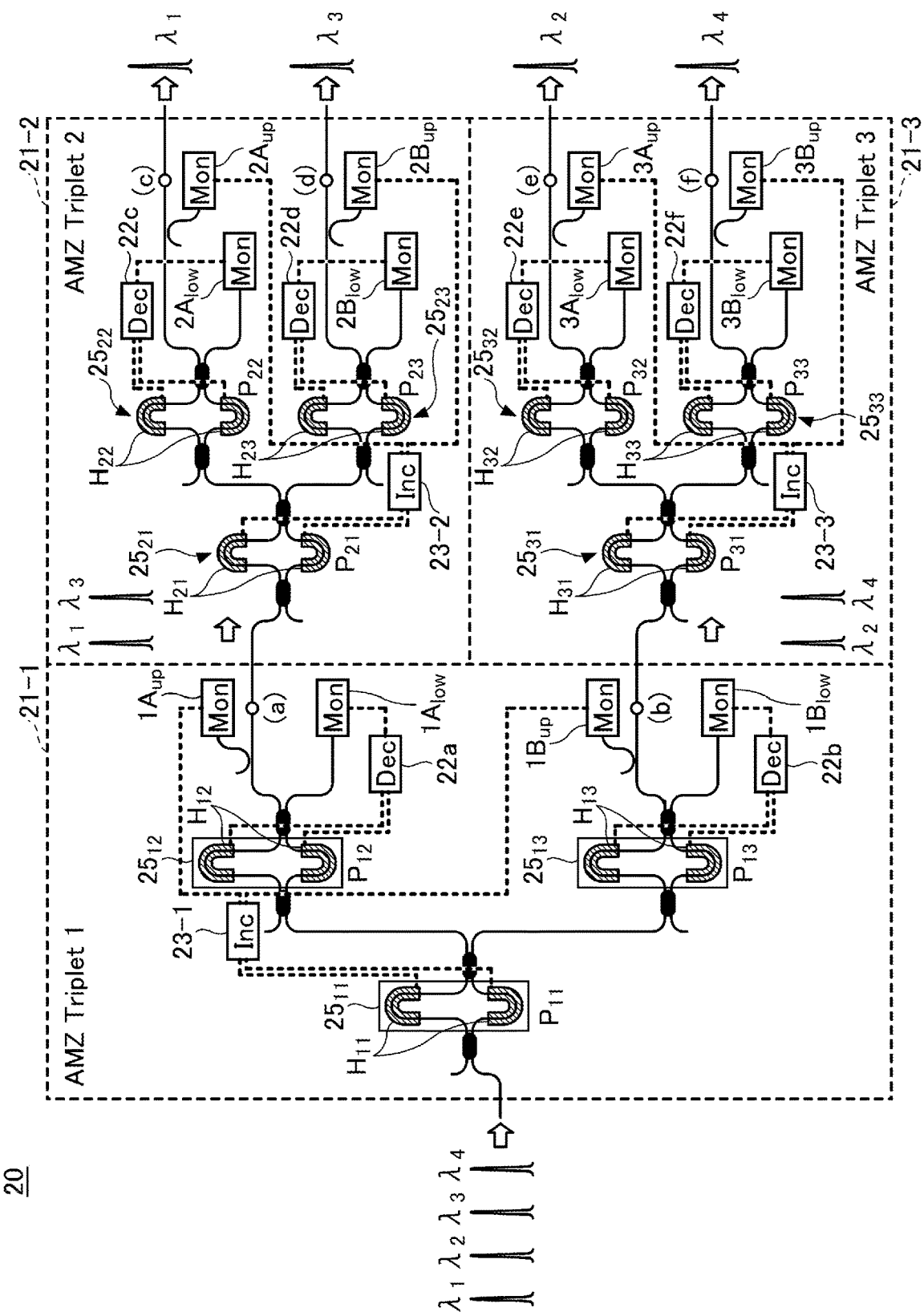
FIG. 5 is a schematic diagram of a demultiplexer used in the optical transceiver in FIG. 4.

FIG. 5 is a schematic diagram of a demultiplexer 20 in FIG. 4. The demultiplexer 20 includes unit circuits 21-1, 21-2, and 21-3 that are cascaded in a tree form. Each of the unit circuits 21-1, 21-2, and 21-3 is formed of three asymmetric Mach-Zehnder (AMZ) interferometers 25 cascaded in a tree configuration. This demultiplexer configuration will be referred to as a CAT (Cascaded AMZ Triplet).

In the example in FIG. 5, in order to demultiplex four wavelengths $\lambda_1, \lambda_2, \lambda_3$, and $\lambda_4$, a two-stage CAT is used in which the unit circuits 21-2 and 21-3 are respectively connected to two outputs of the unit circuit 21-1 at the head of the demultiplexer 20. When more wavelengths are to be demultiplexed, other unit circuits may be connected to the respective outputs of the unit circuits 21-2 and 21-3 at the second stage, to demultiplex eight wavelengths by a three-stage CAT.

The unit circuit 21-1 at the head includes three AMZ $25_{11}$, $25_{12}$, and $25_{13}$ having the same arm length difference $\Delta L$. In the case of stating that the arm length difference is "the same", it means that an effective arm length difference in design is the same, yet actual products may include an allowable error, manufacturing variation, or the like. Asymmetric optical waveguides of the AMZ $25_{11}$, $25_{12}$, and $25_{13}$ are provided with heaters $H_{11}$, $H_{12}$, and $H_{13}$, respectively.

The output of the AMZ $25_{11}$ is bifurcated, and the respective branches are connected to the input of the AMZ $25_{12}$ and the input of the AMZ $25_{13}$. The output of the AMZ $25_{12}$ is bifurcated, and one output waveguide is connected to a monitor $1A_{up}$, and another output waveguide is connected to a monitor $1A_{low}$. The output waveguide connected to the monitor $1A_{up}$ serves as a port (a) connected to the unit circuit 21-2 at the second stage. Similarly, the output of the AMZ $25_{13}$ is bifurcated, and one output waveguide is connected to a monitor $1B_{up}$, and another output waveguide is connected to a monitor $1B_{low}$. The output waveguide connected to the monitor $1B_{up}$ serves as a port (b) connected to the unit circuit 21-3 at the second stage.

Monitoring results of the monitor $1A_{up}$ and the monitor $1B_{up}$ are supplied to the control circuit 23-1. The control circuit 23-1 controls power $P_{11}$ of the heater $H_{11}$ in a direction in which the power detected by the monitor $1A_{up}$ and the monitor $1B_{up}$ increases. For this reason, the control circuit 23-1 is denoted as "Inc" in the figures. A monitoring result of the monitor $1A_{low}$ is supplied to a control circuit 22a, and a monitoring result of the monitor $1B_{low}$ is supplied to a control circuit 22b. The control circuit 22a controls power $P_{12}$ of the heater $H_{12}$ in a direction in which the power detected by the monitor $1A_{low}$ decreases. The control circuit 22b controls power $P_{13}$ of the heater $H_{13}$ in a direction in which the power detected by the monitor $1B_{low}$ decreases. For this reason, the control circuits 22a and 22b are denoted as "Dec" in the figures. Dotted lines connecting between each monitor and the control circuit 23 or 22 and between the control circuit 22 or 23 and the heater H represent electric control lines.

The transmission characteristics of the unit circuit 21-1 at the first stage are controlled by the control circuit 23-1 and the control circuits 22a and 22b. The control circuits 23-1, 22a, and 22b and the heaters $H_{11}$, $H_{12}$, and $H_{13}$ are an example of the optical path length controller 201 in FIG. 4. Instead of the heaters $H_{11}$, $H_{12}$, and $H_{13}$, another configuration (such as application of an electric field) capable of controlling optical phases by changing the refractive indices of the asymmetric waveguides of AMZ $25_{11}$, $25_{12}$, and $25_{13}$ may be used. Among the wavelengths $\lambda_1$, $\lambda_2$, $\lambda_3$, and $\lambda_4$ incident on the unit circuit 21-1, $\lambda_1$ and $\lambda_3$ are transmitted to the unit circuit 21-2 at the second stage, and $\lambda_2$ and $\lambda_4$ are transmitted to the unit circuit 21-3 at the second stage.

The three AMZ $25_{21}$, $25_{22}$, and $25_{23}$ forming the unit circuit 21-2 at the second stage have an arm length difference that is half the arm length difference $\Delta L$ of the three AMZ $25_{11}$, $25_{12}$, and $25_{13}$ of the unit circuit 21-1 at the first stage. Similarly, the three AMZ $25_{31}$, $25_{32}$, and $25_{33}$ forming the unit circuit 21-3 at the second stage have an arm length difference that is half the arm length difference $\Delta L$ of the three AMZ $25_{11}$, $25_{12}$, and $25_{13}$ of the unit circuit 21-1 at the first stage. In the case of having unit circuits at the third stage cascaded, each AMZ of the unit circuit at the third stage has an arm length difference that is half the arm length difference of the AMZ of the unit circuits 21-2 and 21-3 at the second stage.

Asymmetric optical waveguides of the AMZ $25_{21}$, $25_{22}$, and $25_{23}$ of the unit circuit 21-2 are provided with heaters $H_{21}$, $H_{22}$, and $H_{23}$, respectively. Asymmetric optical waveguides of the AMZ $25_{31}$, $25_{32}$, and $25_{33}$ of the unit circuit 21-3 are provided with heaters $H_{31}$, $H_{32}$, and $H_{33}$, respectively.

The output of the AMZ $25_{22}$ is bifurcated, and one output waveguide is connected to a monitor $2A_{up}$, and another output waveguide is connected to a monitor $2A_{low}$. The output waveguide connected to the monitor $2A_{up}$ serves as an output port (c) of the wavelength $\lambda_1$. The output of the AMZ $25_{23}$ is bifurcated, and one output waveguide is connected to a monitor $2B_{up}$, and another output waveguide is connected to a monitor $2B_{low}$. The output waveguide connected to the monitor $2B_{up}$ serves as an output port (d) of the wavelength $\lambda_3$.

Monitoring results of the monitor $2A_{up}$ and the monitor $2B_{up}$ are supplied to the control circuit 23-2. The control circuit 23-2 controls power $P_{21}$ of the heater $H_{21}$ in a direction in which the power detected by the monitor $2A_{up}$ and the monitor $2B_{up}$ increases. For this reason, the control circuit 23-2 is denoted as "Inc" in the figures. A monitoring result of the monitor $2A_{low}$ is supplied to the control circuit 22c, and a monitoring result of the monitor $2B_{low}$ is supplied to the control circuit 22d. The control circuit 22c controls power $P_{22}$ of the heater $H_{22}$ in a direction in which the power detected by the monitor $2A_{low}$ decreases. The control circuit 22d controls power $P_{23}$ of the heater $H_{23}$ in a direction in which the power detected by the monitor $2B_{low}$ decreases. For this reason, the control circuits 22c and 22d are denoted as "Dec" in the figures.

The output of the AMZ $25_{32}$ of the unit circuit 21-3 is bifurcated, and one output waveguide is connected to a monitor $3A_{up}$, and another output waveguide is connected to a monitor $3A_{low}$. The output waveguide connected to the monitor $3A_{up}$ serves as an output port (e) of the wavelength $\lambda_2$. The output of the AMZ $25_{33}$ is bifurcated, and one output waveguide is connected to a monitor $3B_{up}$, and another output waveguide is connected to a monitor $3B_{low}$ The output waveguide connected to the monitor $3B_{up}$ serves as an output port (f) of the wavelength $\lambda_4$.

Monitoring results of the monitor $3A_{up}$ and the monitor $3B_{up}$ are supplied to the control circuit 23-3. The control circuit 23-3 controls power $P_{31}$ of the heater $H_{31}$ in a direction in which the power detected by the monitor $3A_{up}$ and the monitor $3B_{up}$ increases. For this reason, the control circuit 23-3 is denoted as "Inc" in the figures. A monitoring result of the monitor $3A_{low}$ is supplied to the control circuit 22e, and a monitoring result of the monitor $3B_{low}$ is supplied to the control circuit 22f. The control circuit 22e controls power $P_{32}$ of the heater $H_{32}$ in a direction in which the power detected by the monitor $3A_{low}$ decreases. The control circuit 22f controls power $P_{33}$ of the heater $H_{33}$ in a direction in which the power detected by the monitor $3B_{low}$ decreases. For this reason, the control circuits 22e and 22f are denoted as "Dec" in the figures.

The transmission characteristics of the unit circuit 21-2 at the second stage are controlled by the control circuit 23-2 and the control circuits 22c and 22d. The transmission characteristics of the unit circuit 21-3 are controlled by the control circuit 23-3 and the control circuits 22e and 22f. The control circuits 23-2, 23-3, 22c, 22d, 22e, and 22f and the heaters $H_{21}$, $H_{22}$, $H_{23}$, $H_{31}$, $H_{32}$, and $H_{33}$ are an example of the optical path length controller 201 in FIG. 4. As described above, another mechanism of optical path length control may be used instead of the heaters.

In the demultiplexer 20 having the CAT configuration illustrated in FIG. 5, manufacturing variations of the optical waveguides in each AMZ 25 and variations in refractive indices due to temperature variations can be compensated, and the respective AMZ can be controlled to optimum conditions for signal wavelengths being input. By configuring the unit circuit 21 with the three AMZ 25 circuits, it is possible to determine whether the transmission characteristics of the respective wavelengths are optimally controlled from monitored values tapped at the respective output ports. Based on the monitoring results of the taps, control can be executed individually such that the power of a wavelength of interest is increased, whereas the power of an unnecessary wavelength is decreased. However, in the case where the wavelengths output from the light source elements 12 of the light source device 11A are not uniform, even if the transmission characteristics are controlled by optimum power control for each of the wavelengths, the wavelengths are separated at non-uniform optical-frequency spacing. Therefore, by monitoring the wavelengths $\lambda_1$, $\lambda_2$, $\lambda_3$, and $\lambda_4$ output from the ports (c), (d), (e), and (f) by the monitor PD 202 as in FIG. 4, and feeding back the monitoring results to the wavelength controller 191A, the oscillation wavelengths of the light source elements 12 of the light source device 11A are controlled. Instead of separately providing the monitor PD 202, monitoring results of the monitor $2A_{up}$, $2B_{up}$, $3A_{up}$, and $3B_{up}$ of the demultiplexer 20 may be used for controlling the wavelengths of the light source device 11A.

Figure 6:
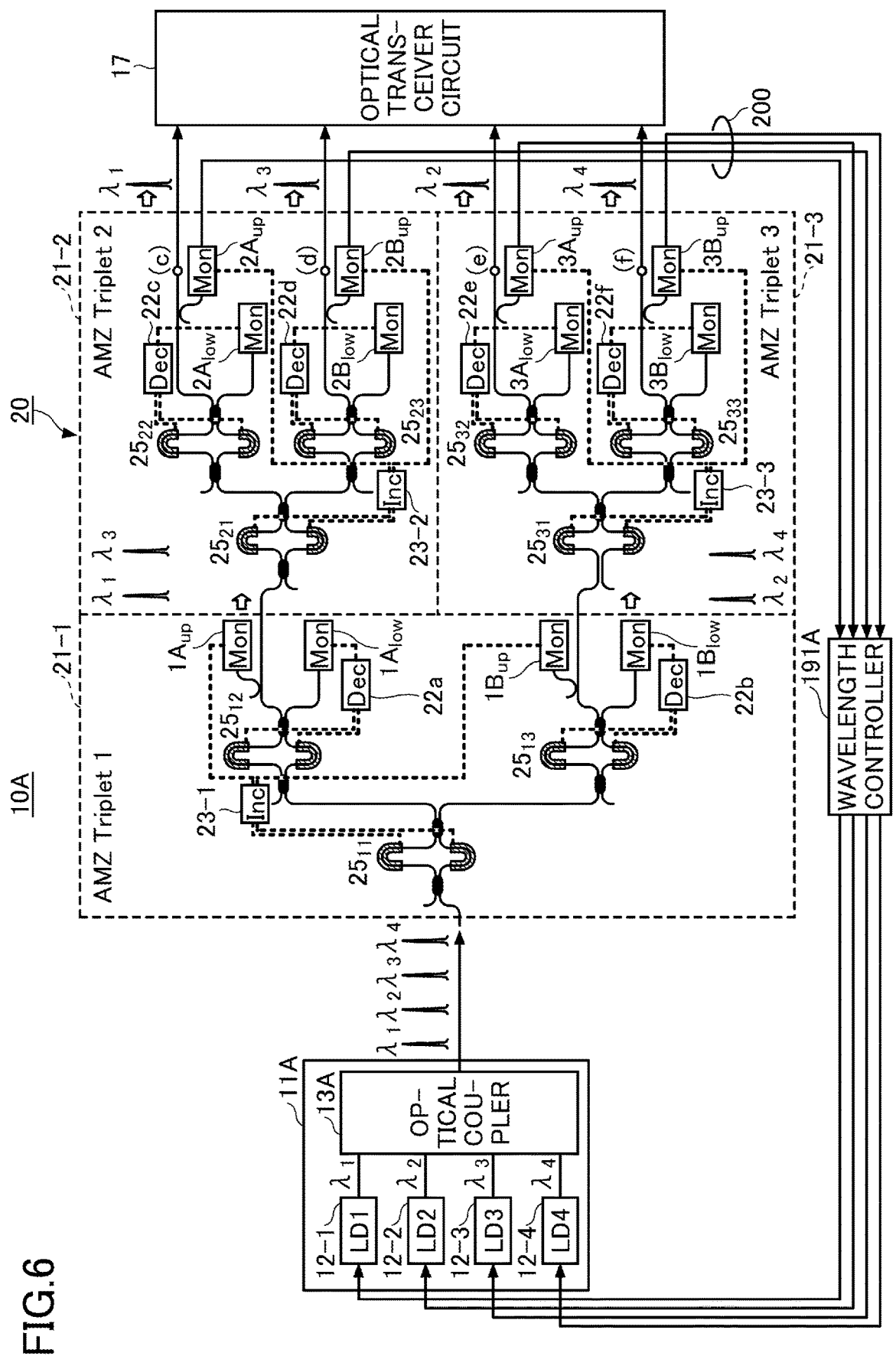
FIG. 6 is a schematic diagram of light source wavelength control using a monitoring function of the demultiplexer in FIG. 4.

FIG. 6 is a schematic diagram of light source wavelength control using a monitoring function of the demultiplexer 20. In FIG. 6, the outputs of the monitors $2A_{up}$, $2B_{up}$, $3A_{up}$, and $3B_{up}$ for controlling the transmission characteristics of the demultiplexer 20 are connected to the input of the wavelength controller 191A via the feedback signal lines 200. As described above, the outputs of the monitors $2A_{up}$, $2B_{up}$, $3A_{up}$, and $3B_{up}$ represent the monitoring results for the respective wavelengths of interest. Based on the monitoring results, the wavelength controller 191A controls the oscillation wavelengths $\Delta_1$, $\lambda_2$, $\lambda_3$, and $\lambda_4$ of the respective light source elements 12-1, 12-2, 12-3, and 12-4 of the light source device 11A, so as to have uniform spacing. Specific control steps will be described below with reference to FIGS. 7 to 15.

During actual operation, light rays output from the light source elements 12-1, 12-2, 12-3, and 12-4 are multiplexed by the optical coupler 13A to be incident on the demultiplexer 20. Light rays of the respective wavelengths demultiplexed by the demultiplexer 20 are modulated by the corresponding optical modulators 173 of the transmitter circuit 171. When controlling the transmission characteristics of the demultiplexer 20, the light rays are input into the demultiplexer 20 one wavelength at a time, and the transmission characteristic of the demultiplexer 20 is controlled based on the monitoring result in the optical waveguide through which the light of the wavelength passes. In a state where all the light rays output from the light source elements 12-1 to 12-4 are incident on the demultiplexer 20, in parallel with the control of the transmission characteristics of the demultiplexer 20 (using the monitoring results for the transmission characteristic control), the wavelength spacing of the light source elements 12-1 to 12-4 is controlled by the wavelength controller 191A.

Figure 7:
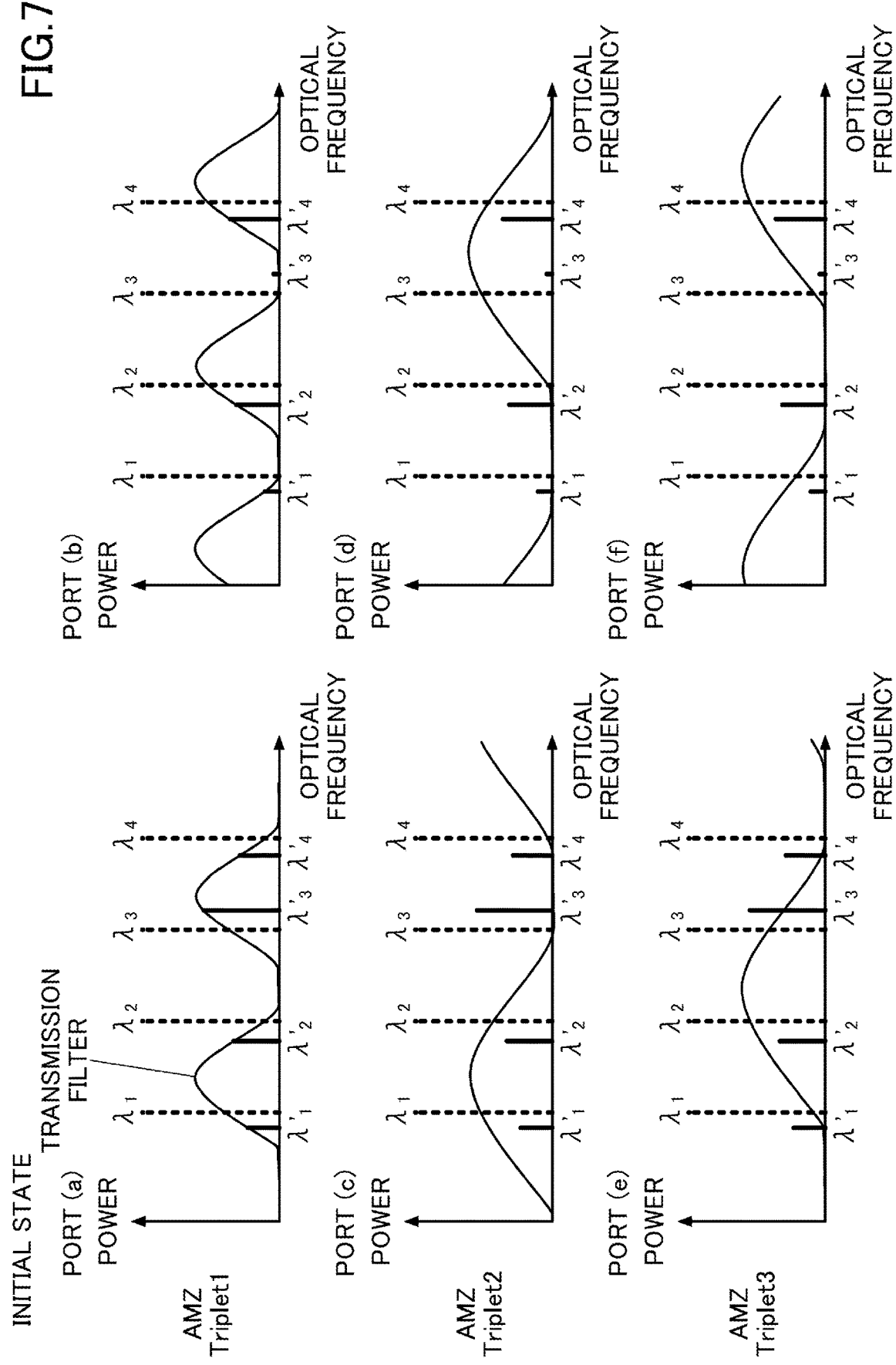
FIG. 7 is a diagram illustrating light source wavelengths in an initial state and transmission characteristics of a demultiplexer.

FIG. 7 illustrates light source wavelengths in an initial state and transmission characteristics of a demultiplexer, and more specifically illustrates respective wavelengths and transmission characteristics at ports (a), (b), (c), (d), (e), and (f) in FIG. 5. Wavelengths $\lambda_1$, $\lambda_2$, $\lambda_3$, and $\lambda_4$ indicated by dotted lines are center wavelengths of subcarriers set to have uniform spacing. $\lambda'_1$, $\lambda'_2$, $\lambda'_3$, and $\lambda'_4$ are wavelengths included in light rays output from the light source device 11A and incident on the demultiplexer 20. $\lambda'_1$, $\lambda'_2$, and $\lambda'_4$ are shifted from $\lambda_1$, $\lambda_2$, and $\lambda_4$ to the lower-frequency side (longer-wavelength side), and $\lambda'_3$ is shifted from $\lambda_3$ to the higher-frequency side (shorter-wavelength side).

It is desired to adjust peaks of the transmission spectrum to $\lambda'_1$ and $\lambda'_3$ at the port (a) of the AMZ 25-1 at the first stage, and adjust peaks of the transmission spectrum to $\lambda'_2$ and $\lambda'_4$ at the port (b). It is desired to adjust a peak of the transmission spectrum to $\lambda'_1$ at the port (c) of the AMZ 25-2 at the second stage, and adjust a peak of the transmission spectrum to $\lambda'_3$ at the port (d). It is desired to adjust the peak of the transmission spectrum to $\lambda'_2$ at the port (e) of the AMZ 25-3 at the second stage, and adjust the peak of the transmission spectrum to $\lambda'_4$ at the port (f).

Figure 8:
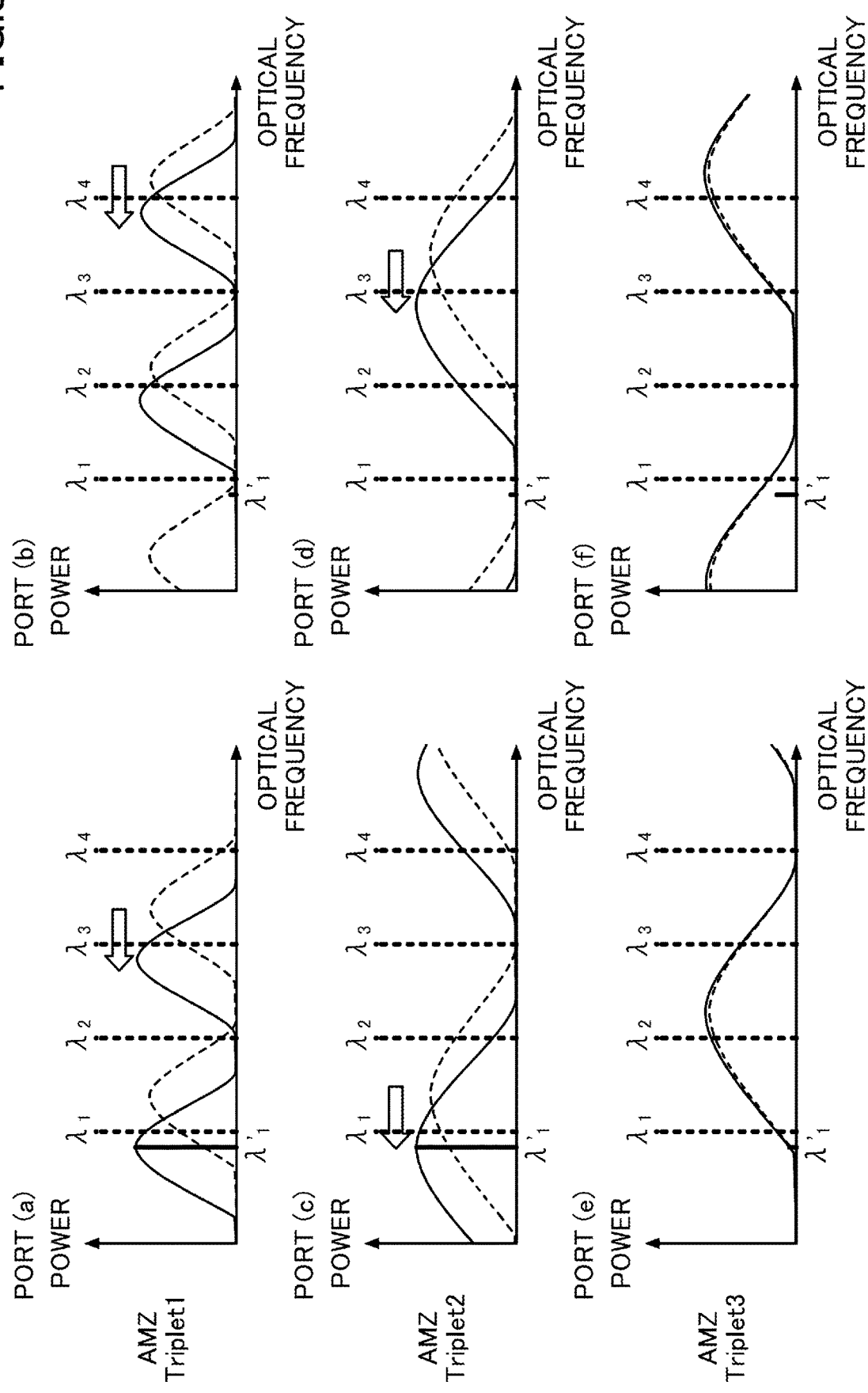
FIG. 8 is a diagram illustrating an example of assignment of wavelengths to respective ports.

FIGS. 8 to 11 illustrate examples of assignment of wavelengths to respective ports. Upon assigning the wavelengths to the ports, light rays are incident on the demultiplexer 20 one wavelength at a time to adjust the transmission characteristic of the demultiplexer 20, to assign the wavelengths to the ports sequentially. In FIG. 8, the light source element 12-1 is turned on (activated) to make the wavelength $\lambda'_1$ incident on the demultiplexer 20. At the port (a), the powers $P_{11}$ and $P_{12}$ of the heaters $H_{11}$ and $H_{12}$ are controlled in a direction in which the monitoring result of the monitor $1A_{up}$ increases and the monitoring result of the monitor $1A_{low}$ decreases, to shift the transmission spectrum. At this time, at port (b), although there is no feedback from the monitor $1B_{up}$ and $1B_{low}$ (hereafter, collectively referred to as the monitor 1B), the transmission spectrum moves due to the influence of control of the power $P_{11}$.

At the port (c), the powers $P_{21}$ and $P_{22}$ are controlled in a direction in which the monitoring result of the monitor $2A_{up}$ increases and the monitoring result of the monitor $2A_{low}$ decreases, to shift the transmission spectrum. At this time, at port (d), although there is no feedback from the monitor 2B, the transmission spectrum moves due to the influence of control of the power $P_{21}$. There is no optical input to the unit circuit 21-3 at the ports (e) and (f); therefore, the transmission spectrum hardly changes.

Figure 9:
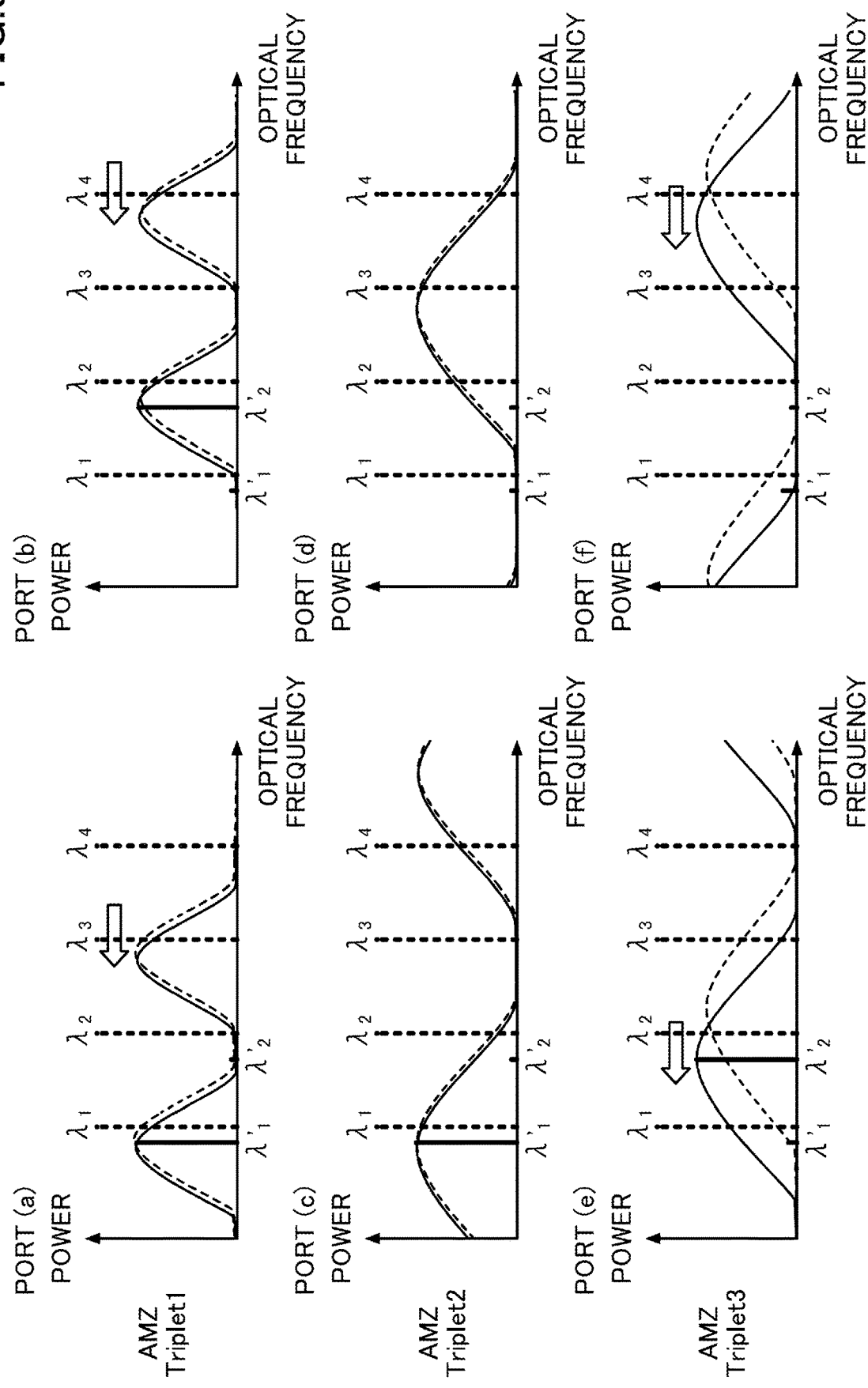
FIG. 9 is a diagram illustrating an example of assignment of wavelengths to respective ports.

Next, in FIG. 9, the light source element 12-2 is turned on to add $\lambda'_2$. The light source elements 12-1 and 12-2 are in active states. At the port (a), the powers $P_{11}$ and $P_{12}$ are controlled in a direction in which the monitoring result of the monitor $1A_{up}$ increases and the monitoring result of the monitor $1A_{low}$ decreases, to shift the transmission spectrum. At the port (b), the powers $P_{11}$ and $P_{13}$ are controlled in a direction in which the monitoring result of the monitor $1B_{up}$ increases and the monitoring result of the monitor $1B_{low}$ decreases, to adjust the transmission spectrum.

At the port (c), the powers $P_{21}$ and $P_{22}$ are controlled in a direction in which the monitoring result of the monitor $2A_{up}$ increases and the monitoring result of the monitor $2A_{low}$ decreases, to adjust the transmission spectrum. At this time, at port (d), the amount of control of the power $P_{21}$ is negligible, and there is little effect of control of the power $P_{21}$. At the port (e), the powers $P_{31}$ and $P_{32}$ are controlled in a direction in which the monitoring result of the monitor $3A_{up}$ increases and the monitoring result of the monitor $3A_{low}$ decreases, to adjust the transmission spectrum. At this time, at port (f), although there is no feedback from the monitor 3B, the transmission spectrum moves due to the influence of control of the power $P_{31}$.

Figure 10:
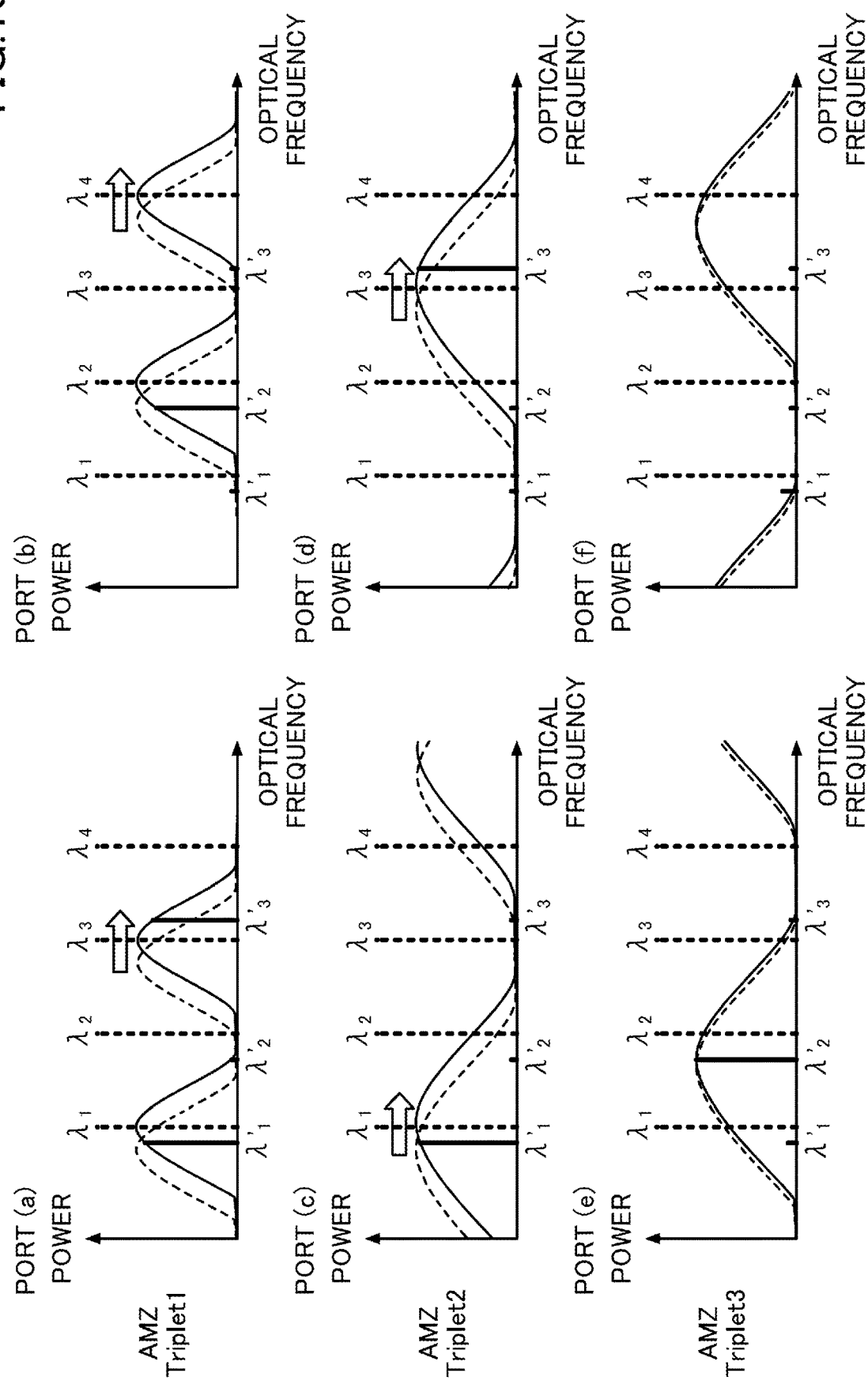
FIG. 10 is a diagram illustrating an example of assignment of wavelengths to respective ports.

Next, in FIG. 10, the light source element 12-3 is turned on to add $\lambda'_3$. The light source elements 12-1, 12-2, and 12-3 are in active states. At the port (a), the powers $P_{11}$ and $P_{12}$ are controlled in a direction in which the monitoring result of the monitor $1A_{up}$ increases and the monitoring result of the monitor $1A_{low}$ decreases, to shift the transmission spectrum. At the port (b), the powers $P_{11}$ and $P_{13}$ are controlled in a direction in which the monitoring result of the monitor $1B_{up}$ increases and the monitoring result of the monitor $1B_{low}$ decreases, to adjust the transmission spectrum.

At the port (c), the powers $P_{21}$ and $P_{22}$ are controlled in a direction in which the monitoring result of the monitor $2A_{up}$ increases and the monitoring result of the monitor $2A_{low}$ decreases, to adjust the transmission spectrum. At the port (d), the powers $P_{21}$ and $P_{23}$ are controlled in a direction in which the monitoring result of the monitor $2B_{up}$ increases and the monitoring result of the monitor $2B_{low}$ decreases, to adjust the transmission spectrum. At the ports (e) and (f), only light having a wavelength of $\lambda'_2$ is input to the unit circuit 21-3; therefore, the transmission spectrum hardly changes.

Figure 11:
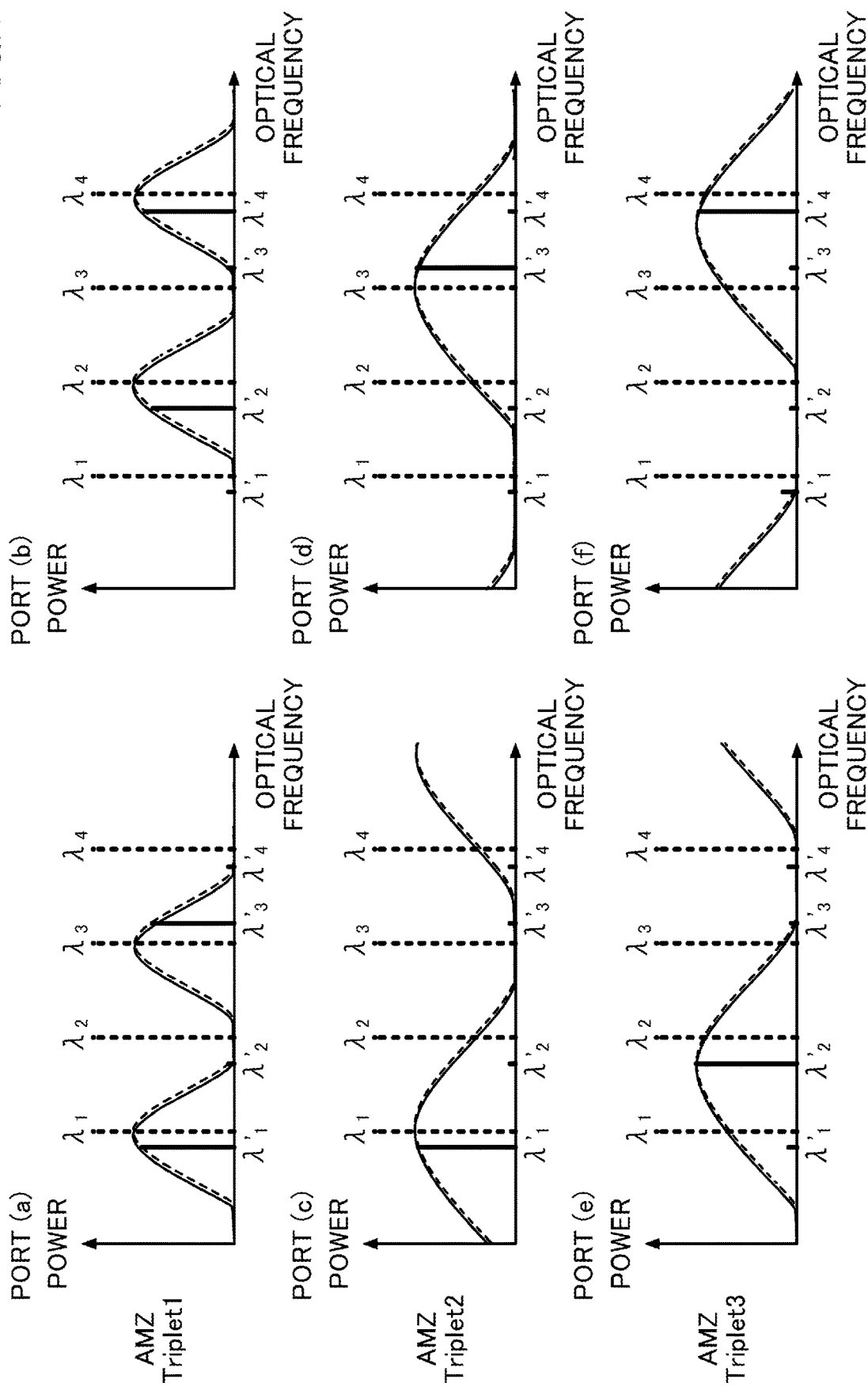
FIG. 11 is a diagram illustrating an example of assignment of wavelengths to respective ports.

Finally, in FIG. 11, the light source element 12-4 is turned on to add $\lambda'_4$. All the light source elements 12-1 to 12-4 are in active states. At the port (a), the powers $P_{11}$ and $P_{12}$ are controlled in a direction in which the monitoring result of the monitor $1A_{up}$ increases and the monitoring result of the monitor $1A_{low}$ decreases, to adjust the transmission spectrum. At the port (b), the powers $P_{11}$ and $P_{13}$ are controlled in a direction in which the monitoring result of the monitor $1B_{up}$ increases and the monitoring result of the monitor $1B_{low}$ decreases, to adjust the transmission spectrum.

At the port (c), the powers $P_{21}$ and $P_{22}$ are controlled in a direction in which the monitoring result of the monitor $2A_{up}$ increases and the monitoring result of the monitor $2A_{low}$ decreases, to adjust the transmission spectrum. At the port (d), the powers $P_{21}$ and $P_{23}$ are controlled in a direction in which the monitoring result of the monitor $2B_{up}$ increases and the monitoring result of the monitor $2B_{low}$ decreases, to adjust the transmission spectrum. At the port (e), the powers $P_{31}$ and $P_{32}$ are controlled in a direction in which the monitoring result of the monitor $3A_{up}$ increases and the monitoring result of the monitor $3A_{low}$ decreases, to adjust the transmission spectrum. At the port (f), the powers $P_{31}$ and $P_{33}$ are controlled in a direction in which the monitoring result of the monitor $3B_{up}$ increases and the monitoring result of the monitor $3B_{low}$ decreases, to adjust the transmission spectrum. Accordingly, assignment of wavelengths to the respective port is completed.

In the state in FIG. 11, the transmission characteristics are controlled at the ports (c), (d), (e) (d), (e), and (f) such that the corresponding wavelengths $\lambda'_1$, $\lambda'_2$, $\lambda'_3$, and $\lambda'_4$ are close to the respective peaks; however, the wavelength spacing is not uniform. Therefore, the oscillation wavelengths of the light source device 11A and the transmission characteristics of the demultiplexer 20 are further controlled so as to correct the spacing of the optical frequencies of the wavelengths $\lambda'_1$, $\lambda'_2$, $\lambda'_3$ and $\lambda'_4$ to become uniform.

Figure 12:
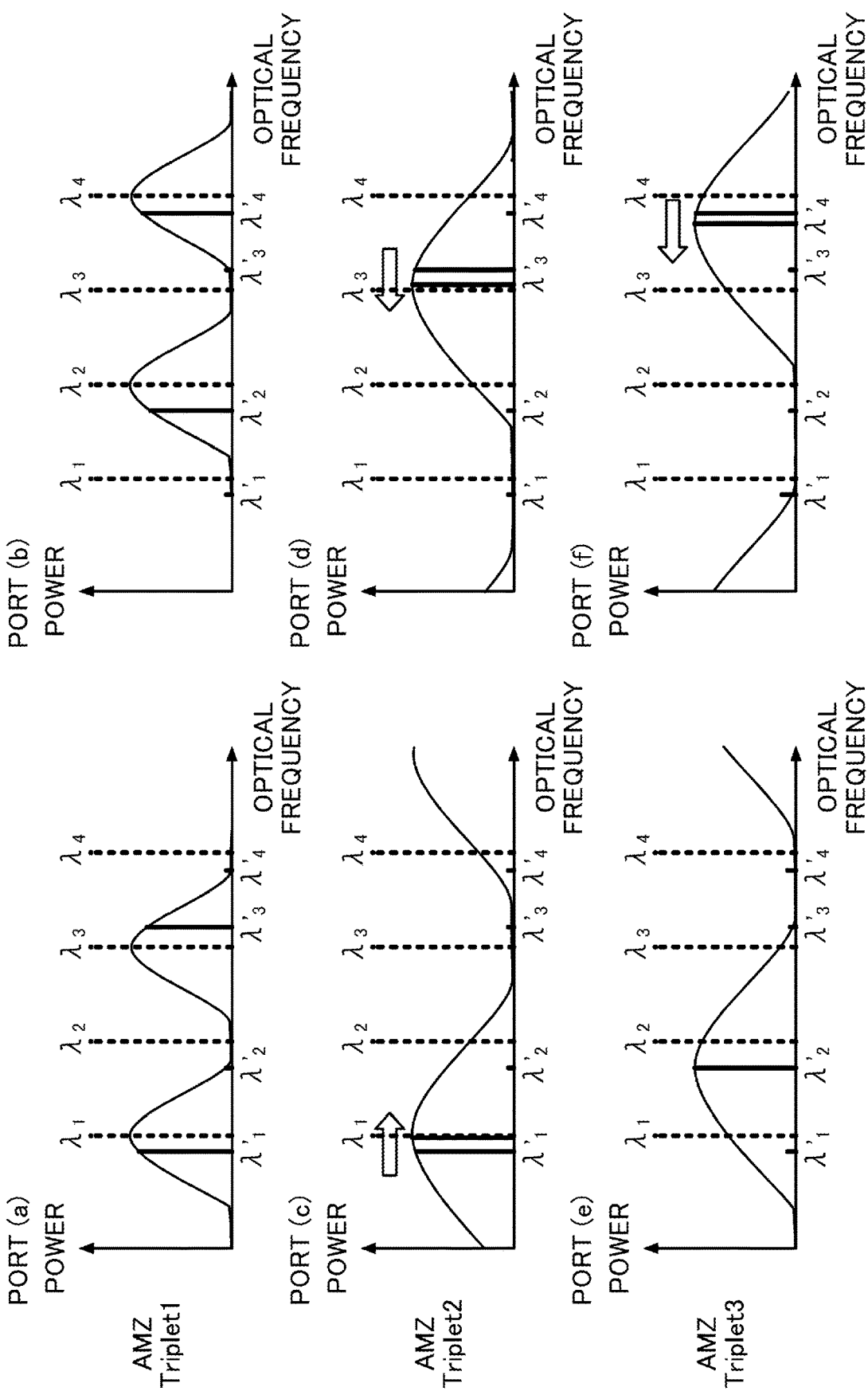
FIG. 12 is a diagram illustrating a process of wavelength correction.
Figure 13:
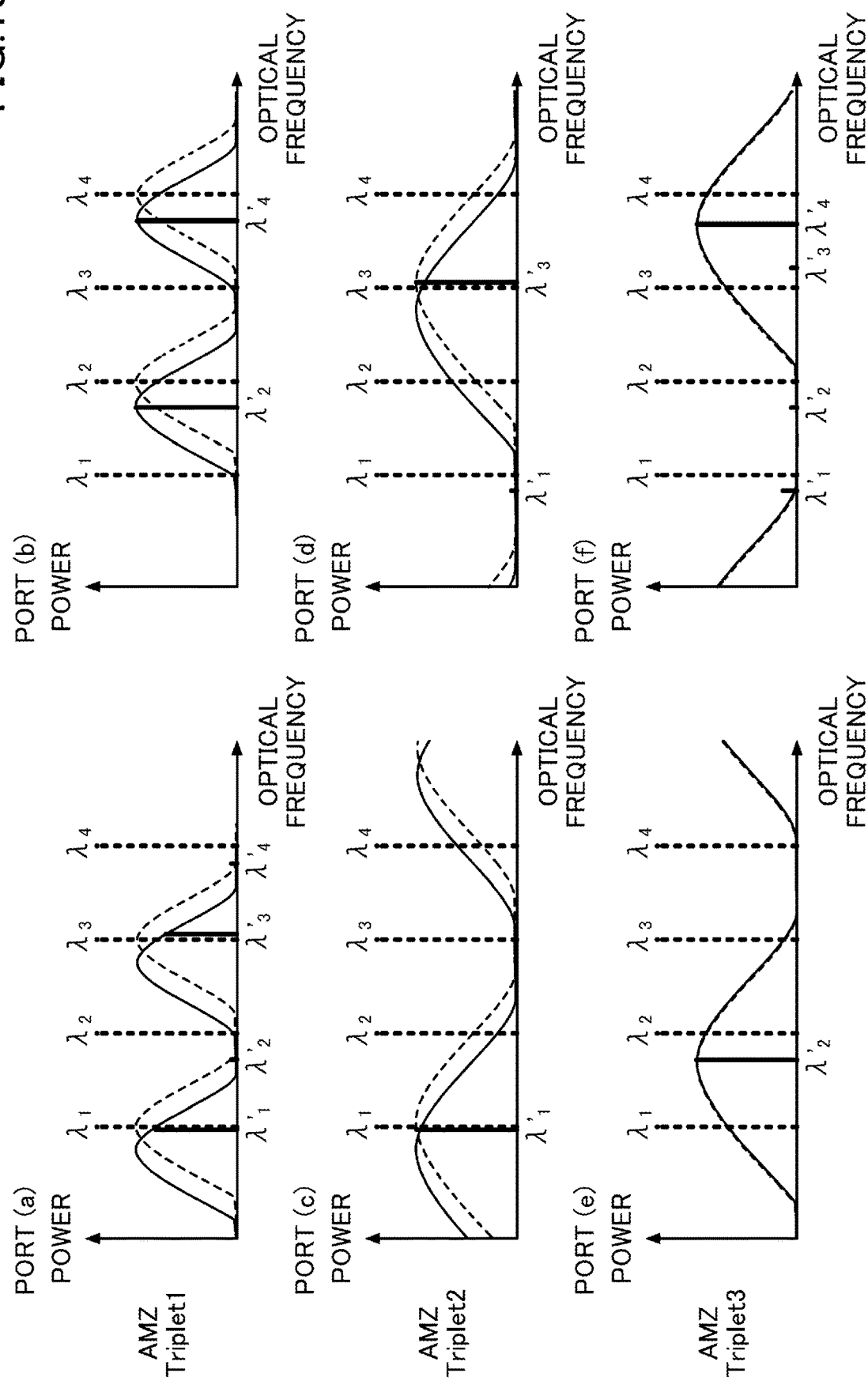
FIG. 13 is a diagram illustrating a process of wavelength correction.

FIG. 12 illustrates a process of wavelength correction by the light source control. In a state of all four wavelengths being incident on the demultiplexer 20, the oscillation wavelengths $\lambda'_1$, $\lambda'_2$, $\lambda'_3$, and $\lambda'_4$ of the light source elements 12-1 to 12-4 of the light source device 11A are controlled by the wavelength controller 191A as follows. At the port (c) of the unit circuit 21-2, the oscillation wavelength $\lambda'_1$ of the light source element 12-1 is controlled in a direction in which the monitoring result of the monitor $2A_{up}$ increases and the monitoring result of the monitor $2A_{low}$ decreases. At the port (d), the oscillation wavelength $\lambda'_3$ of the light source element 12-3 is controlled in a direction in which the monitoring result of the monitor $2B_{up}$ increases and the monitoring result of the monitor $2B_{low}$ decreases. At the port (e) of the unit circuit 21-3, the oscillation wavelength $\lambda'_2$ of the light source element 12-2 is controlled in a direction in which the monitoring result of the monitor $3A_{up}$ increases and the monitoring result of the monitor $3A_{low}$ decreases. At the port (f), the oscillation wavelength $\lambda'_4$ of the light source element 12-4 is controlled in a direction in which the monitoring result of the monitor $3B_{up}$ increases and the monitoring result of the monitor $3B_{low}$ decreases.

Next, in FIG. 13, again, the heaters of the demultiplexer 20 are controlled to adjust the transmission spectrum at the respective ports. At the port (a), the powers $P_{11}$ and $P_{12}$ are controlled in a direction in which the monitoring result of the monitor $1A_{up}$ increases and the monitoring result of the monitor $1A_{low}$ decreases, to shift the transmission spectrum. At the port (b), the powers $P_{11}$ and $P_{13}$ of the heaters $H_{11}$ and $H_{13}$ are controlled in a direction in which the monitoring result of the monitor $1B_{up}$ increases and the monitoring result of the monitor $1B_{low}$ decreases, to shift the transmission spectrum.

At the port (c), the powers $P_{21}$ and $P_{22}$ are controlled in a direction in which the monitoring result of the monitor $2A_{up}$ increases and the monitoring result of the monitor $2A_{low}$ decreases, to shift the transmission spectrum. At the port (d), the powers $P_{21}$ and $P_{23}$ are controlled in a direction in which the monitoring result of the monitor $2B_{up}$ increases and the monitoring result of the monitor $2B_{low}$ decreases, to shift the transmission spectrum. At the port (e), the powers $P_{31}$ and $P_{32}$ are controlled in a direction in which the monitoring result of the monitor $3A_{up}$ increases and the monitoring result of the monitor $3A_{low}$ decreases, to adjust the transmission spectrum. At the port (f), the powers $P_{31}$ and $P_{33}$ are controlled in a direction in which the monitoring result of the monitor $3B_{up}$ increases and the monitoring result of the monitor $3B_{low}$ decreases, to adjust the transmission spectrum.

Figure 14:
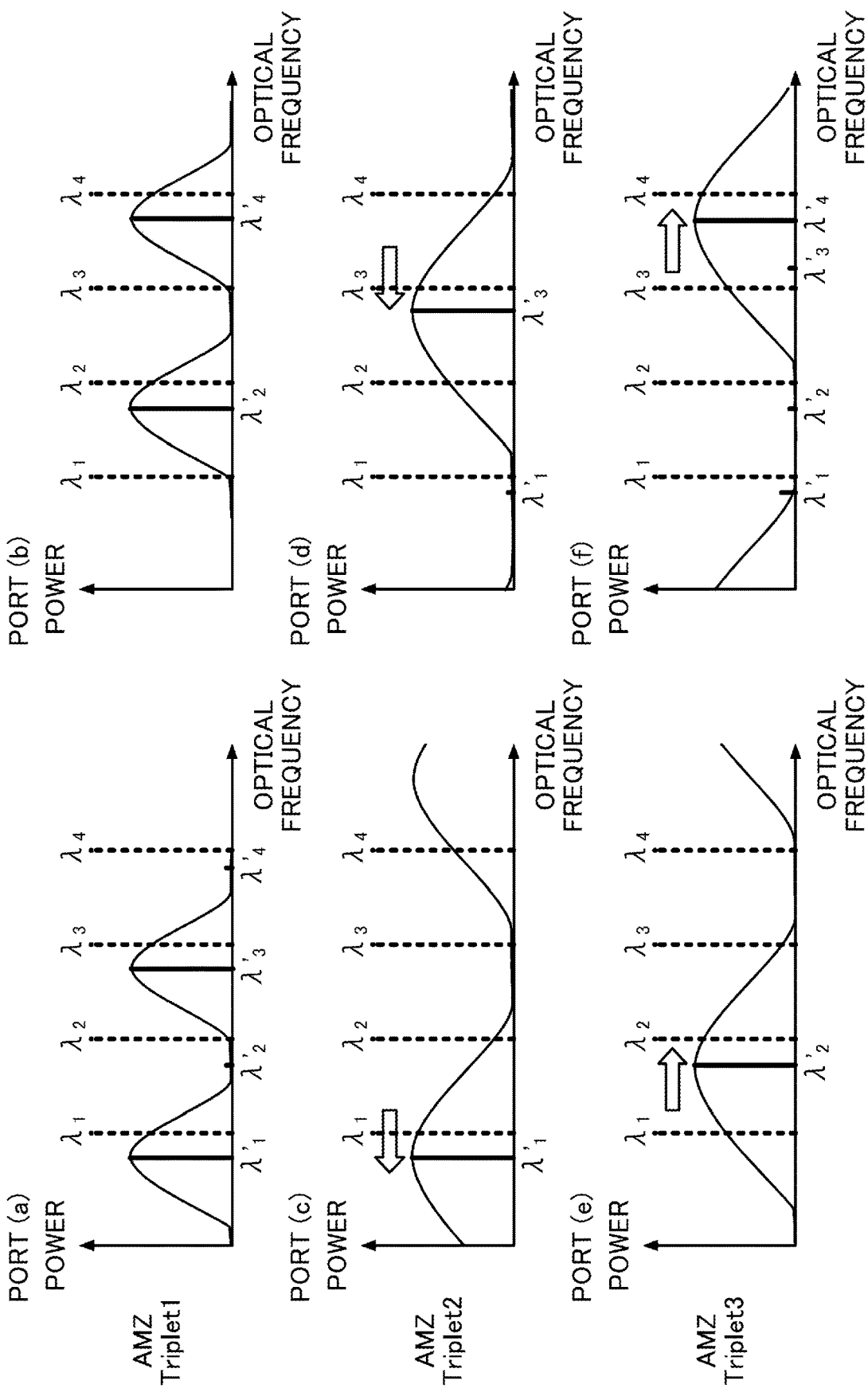
FIG. 14 is a diagram illustrating a process of wavelength correction.

Next, in FIG. 14, the oscillation wavelengths $\lambda'_1$, $\lambda'_2$, $\lambda'_3$, and $\lambda'_4$ of the light source elements 12-1 to 12-4 of the light source device 11A are controlled by the wavelength controller 191A again. At the port (c) of the unit circuit 21-2, the oscillation wavelength $\lambda'_1$ of the light source element 12-1 is controlled in a direction in which the monitoring result of the monitor $2A_{up}$ increases and the monitoring result of the monitor $2A_{low}$ decreases. At the port (d), the oscillation wavelength $\lambda'_3$ of the light source element 12-3 is controlled in a direction in which the monitoring result of the monitor $2B_{up}$ increases and the monitoring result of the monitor $2B_{low}$ decreases. At the port (e) of the unit circuit 21-3, the oscillation wavelength $\lambda'_2$ of the light source element 12-2 is controlled in a direction in which the monitoring result of the monitor $3A_{up}$ increases and the monitoring result of the monitor $3A_{low}$ decreases. At the port (f), the oscillation wavelength $\lambda'_4$ of the light source element 12-4 is controlled in a direction in which the monitoring result of the monitor $3B_{up}$ increases and the monitoring result of the monitor $3B_{low}$ decreases.

Figure 15:
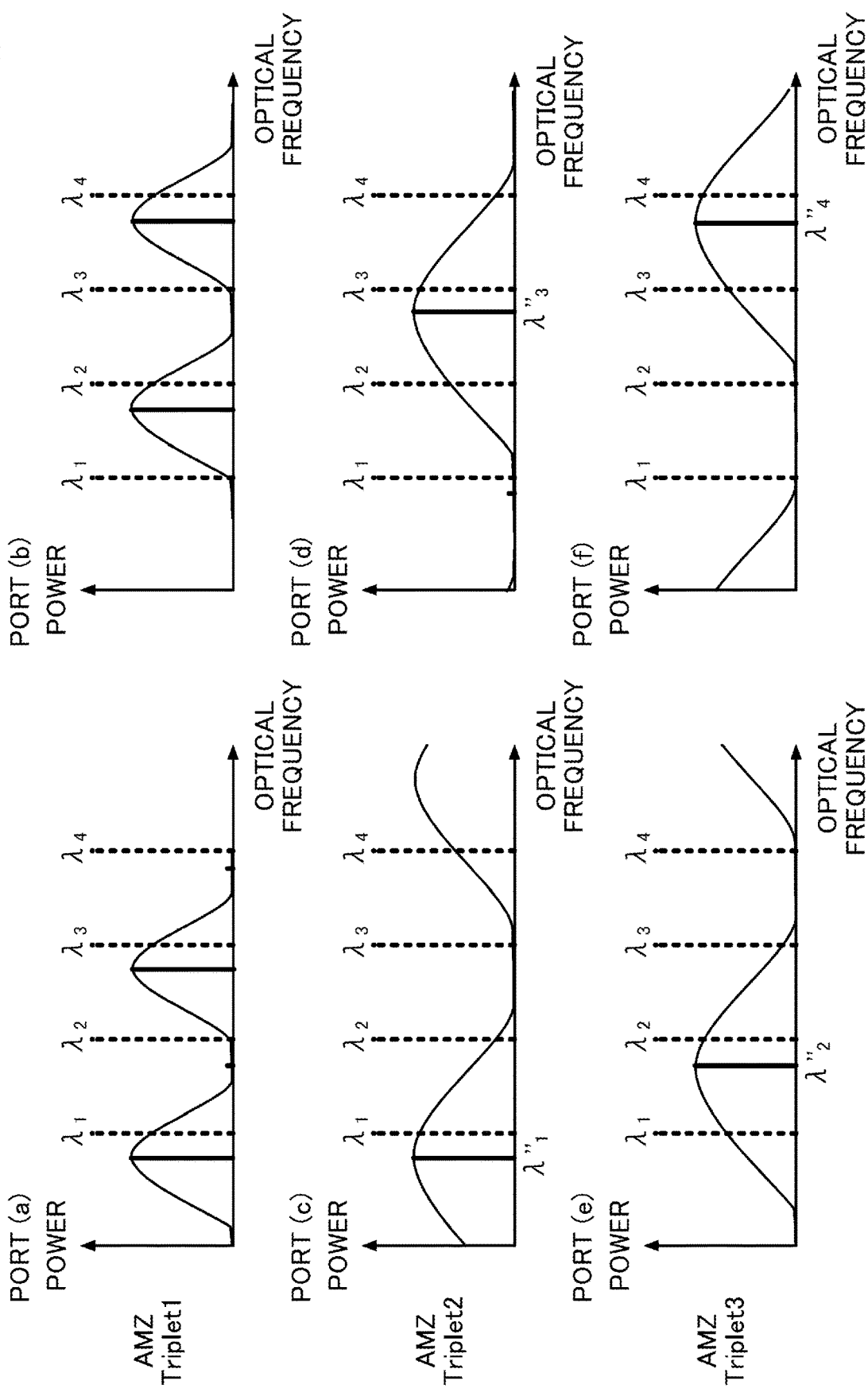
FIG. 15 is a diagram illustrating a final state of light source wavelength settings.

A final state illustrated in FIG. 15 is reached by alternately repeating the correction of the oscillation wavelengths of the light source elements 12-1 to 12-4 of the light source device 11A and the adjustment of the transmission characteristics of the demultiplexer 20. Denoting the wavelengths of the subcarriers in the control completion state in FIG. 15 as $\lambda''_1$, $\lambda''_2$, $\lambda''_3$, and $\lambda''_4$, peaks of the transmission spectrum of the port (a) of the unit circuit 21-1 at the first stage coincide with the wavelengths $\lambda''_1$ and $\lambda''_3$, and peaks of the transmission spectrum of the port (b) coincide with the wavelengths $\lambda''_2$ and $\lambda''_4$. A peak of the transmission spectrum at the port (c) of the unit circuit 21-2 at the second stage coincides with the wavelength $\lambda''_1$, and a peak of the transmission spectrum at the port (d) coincides with the wavelength $\lambda''_3$. A peak of the transmission spectrum at the port (e) of the unit circuit 21-3 at the second stage coincides with the wavelength $\lambda''_2$, and a peak of the transmission spectrum at the port (f) coincides with the wavelength $\lambda''_4$.

In this state, $\lambda'''1$ is not the same as the wavelength $\lambda_1$ being set ($\lambda''_1 \neq \lambda_1$), but the wavelength spacing is the same for $\lambda''_1 - \lambda''_2$, $\lambda''_2 - \lambda''_3$, and $\lambda''_3 - \lambda''_4$ ($\lambda''_1 - \lambda''_2 = \lambda''_2 \lambda''_3 = \lambda''_3 - \lambda''_4$. By feeding back the monitoring results at the outputs of the demultiplexer 20 to the wavelength controller 191A, the oscillation wavelengths of the light source elements 12 of the light source device 11A can be made uniformly spaced, and can be coincident with the transmission characteristics of the demultiplexer 20. Accordingly, the monitoring results of the transmission characteristic control are used for precisely controlling the wavelength spacing of the light source device 11A.

Figure 16A:
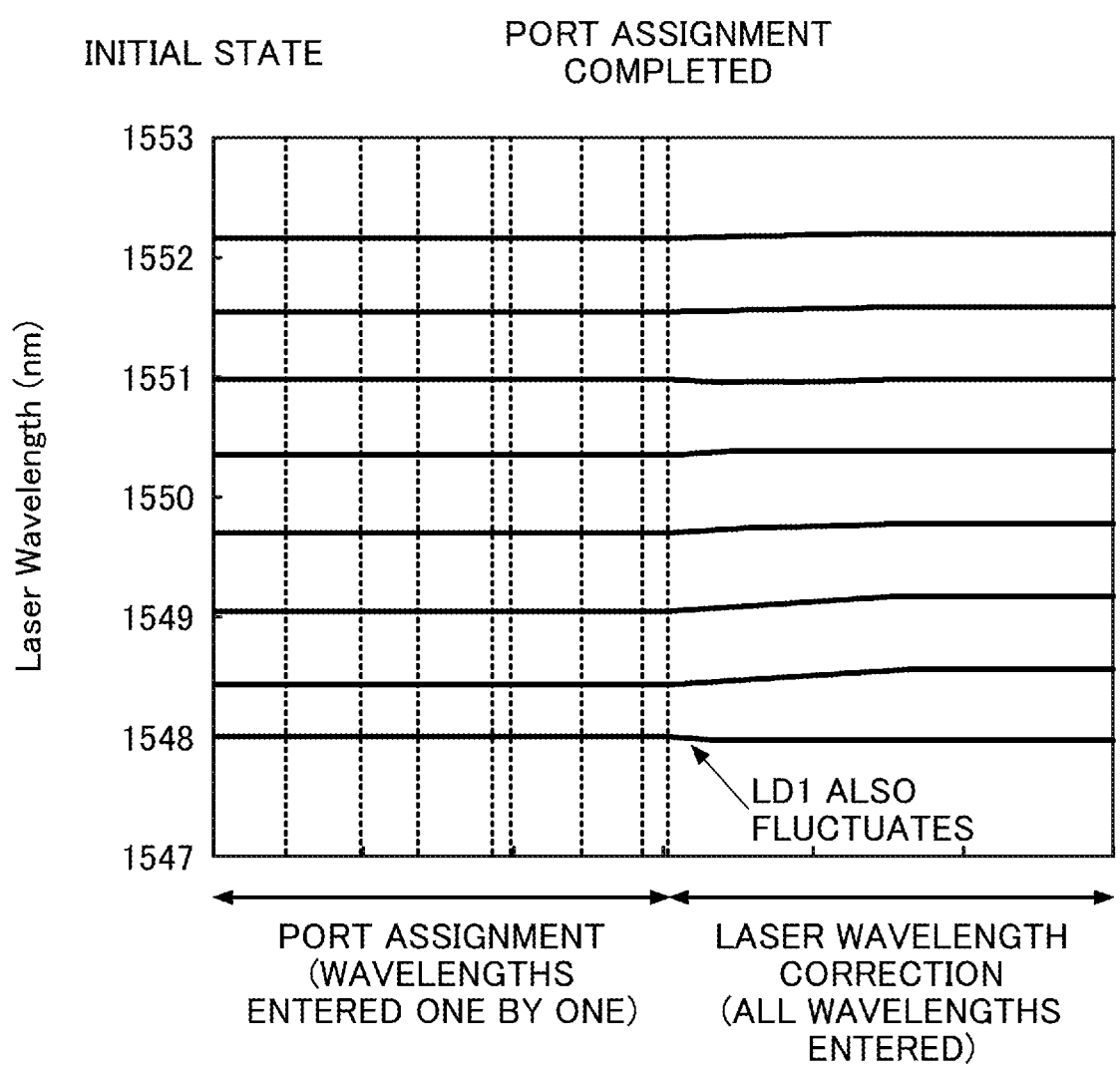
FIG. 16A is a diagram illustrating change in wavelengths during control.
Figure 16B:
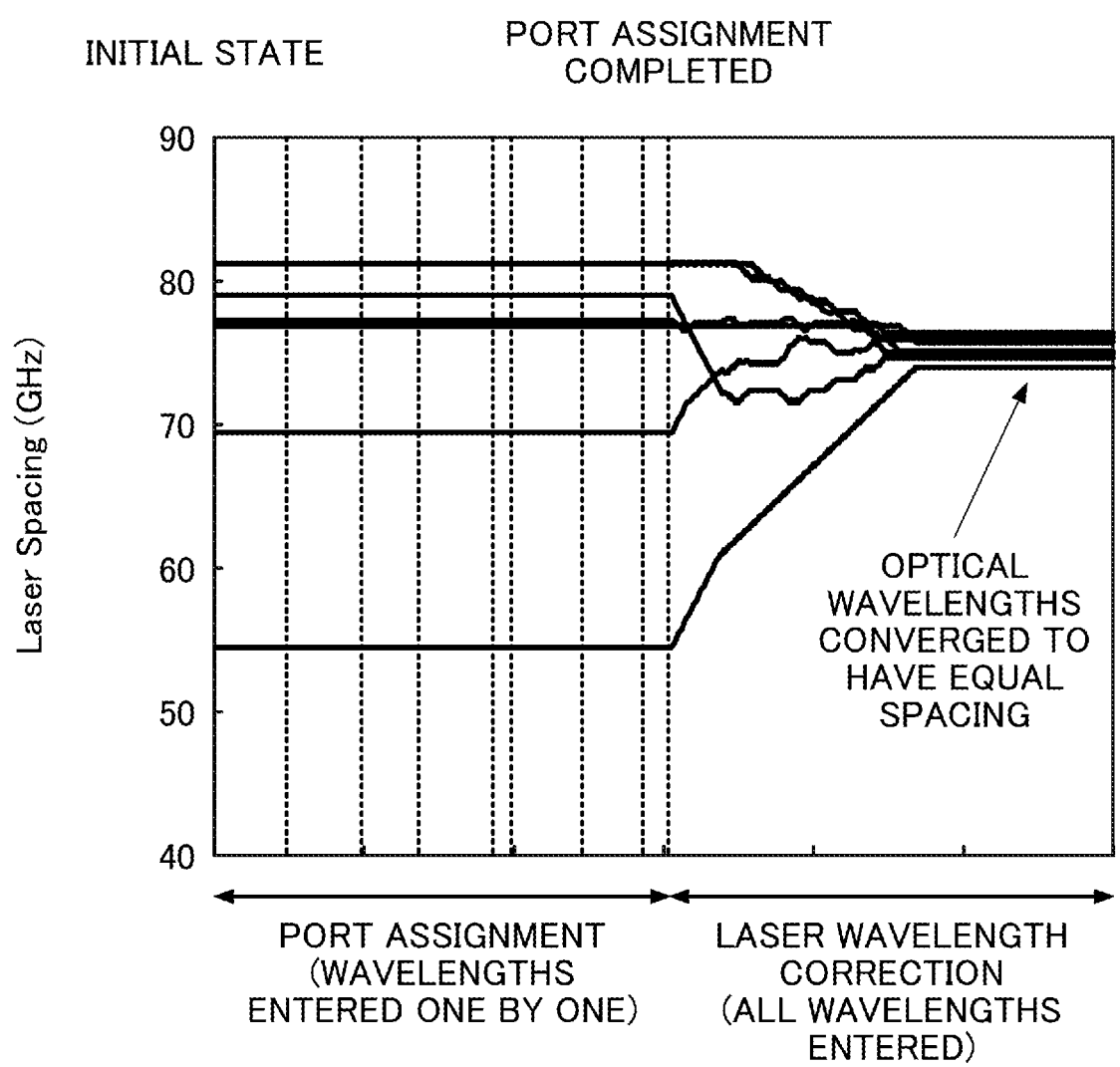
FIG. 16B is a diagram illustrating change in wavelength spacing during control.

FIG. 16A illustrates change in respective wavelengths during light source wavelength control in the first embodiment. FIG. 16B illustrates change in wavelength spacing during the course of control of light source wavelengths. In FIGS. 16A and 16B, eight wavelengths are demultiplexed by using unit circuits of a CAT configuration cascaded in three stages, and the wavelength spacing of the light source devices is controlled to be uniform. In the horizontal axis direction, port assignment is executed starting from the initial state, and then, light source wavelength correction is executed. During the period of port assignment, the transmission characteristics of the demultiplexer are controlled based on the monitoring results existing from the input end of the demultiplexer 20 to the output port of the wavelength of interest. In the correction of the laser wavelength, the oscillation wavelength of a corresponding light source element 12 is adjusted so that the monitoring result of the monitor provided at the output port of the corresponding wavelength increases and the monitoring result of the monitor connected to the optical waveguide on the opposite side of the output port decreases. The output port is one of the two output waveguides of the AMZ 25 at the end of the cascaded tree, the other output waveguide is the optical waveguide on the opposite side with respect to the output port. In the first embodiment, the wavelength spacing is controlled to be relatively uniform; therefore, even though the wavelengths of all the light sources fluctuate, all the wavelengths (i.e., optical frequencies) finally converge to have uniform spacing.

The effective optical path length differences of the respective AMZ 25 of the demultiplexer 20 and the source wavelengths are controlled in parallel so as to maximize the monitored power at the ports (c), (d), (e), and (f) of the demultiplexer 20, and minimize the monitored power at the output waveguides on the opposite side of these ports. Accordingly, multiple wavelengths converge to an optimum state illustrated in FIGS. 16A and 16B, and the converged state is maintained.

The heater power can be controlled by adding a small intensity fluctuation (dither ±A) to the heater current, and detecting the direction of change in the monitor output. In the case where the monitor current I+ upon dither +λ is greater than the monitor current I− upon dither −λ, the control circuit 23 of "Inc" determines that the direction of control is correct and makes the heater power one step higher. In the case where the monitor current I+ upon dither +λ is smaller than the monitor current I− upon dither −λ, the control circuit 23 of "Dec" determines that the direction of control is correct and makes the heater power one step lower.

The light source wavelength is controlled by adjusting the oscillation frequency of each of the light source elements 12-1 to 12-2. For example, a slight offset (dither ±Δ) may be added to the oscillation wavelength of each light source element 12, to raise or lower the oscillation frequency in the direction of change in the monitor output. The configuration and the light source wavelength control of the first embodiment can improve the use efficiency of frequencies, and as well, can reduce the size and cost of the optical transceiver 10A.

Second Embodiment

Figure 17:
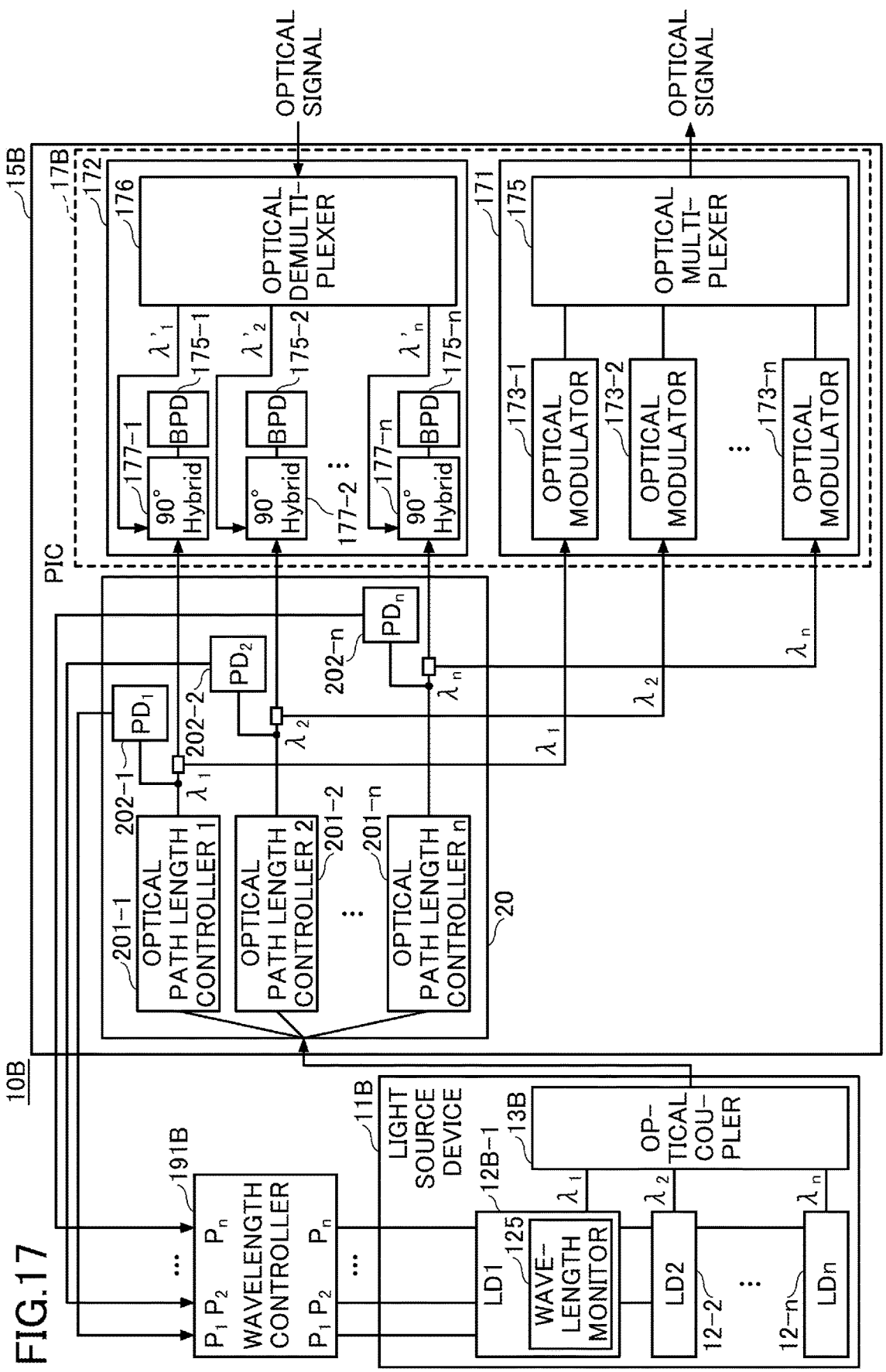
FIG. 17 is a schematic diagram of an optical transceiver of a second embodiment.

FIG. 17 is a schematic diagram of an optical transceiver 10B of a second embodiment. In the second embodiment, the absolute values of wavelengths are controlled together with the wavelength spacing of multiple subcarriers. The absolute values and the wavelength spacing of all wavelengths are controlled by providing a wavelength monitor or a wavelength locker in only one of the multiple light source elements.

The optical transceiver 10B includes a light source device 11B, an photonic integrated circuit 15B, and a wavelength controller 191B. The wavelength controller 191A is implemented with functions of the processor 19 (see FIG. 3). The photonic integrated circuit 15B includes a demultiplexer 20 and an optical transceiver circuit 17B. A receiver circuit 172B of the optical transceiver circuit 17B includes an optical demultiplexer 176, multiple balanced photodiodes (denoted as "BPD" in the FIGS. 175-1, 175-2, . . . , and 175-n (collectively referred to as "BPD 175" as appropriate), and multiple 90-degree hybrid optical mixers 177-1, 177-2, . . . , and 177-n (collectively referred to as "90-degree hybrid optical mixer(s) 177" as appropriate). A transmitter circuit 171B of the optical transceiver circuit 17B includes multiple optical modulators 173-1, 173-2, . . . , and 173-n (collectively referred to as "optical modulator(s) 173" as appropriate) and an optical multiplexer 175. The optical modulator 173 is, for example, an IQ modulator.

The optical transceiver circuit 17B is a front-end circuit for digital coherent transceivers, and in the receiver circuit 172B, the 90-degree hybrid optical mixer 177 detects a signal of received light using part of light output from the light source device 11B as locally oscillated light. Therefore, in the multiple light source elements 12 used in the light source device 11B, absolute values of wavelengths are required as well as uniform spacing of the wavelengths.

In order to precisely determine the absolute values of the wavelengths, although one light source element 12 (e.g., light source element 12-1) in the light source device 11B is provided with a wavelength monitor 125, the other light source elements 12 do not need wavelength monitors. By taking the oscillation wavelength of the light source element 12-1 having the wavelength monitor 125 as a reference wavelength, and controlling the oscillation wavelengths of the other light source elements 12-2 to 12-n to have uniform spacing starting from the reference wavelength, the uniform wavelength spacing and the absolute values of the wavelengths can be obtained precisely.

Monitoring results of light rays demultiplexed by the demultiplexer 20 are used for controlling the wavelength spacing and the absolute values of the wavelengths. By using the demultiplexer 20 having a CAT configuration, the heater power can be controlled optimally for each wavelength, to optimize the transmission characteristics. The monitors PD 202-1, 202-2, . . . , and 202-n may be provided for monitoring light rays of respective wavelengths, or a monitoring function of the demultiplexer 20 may be used.

Figure 18:
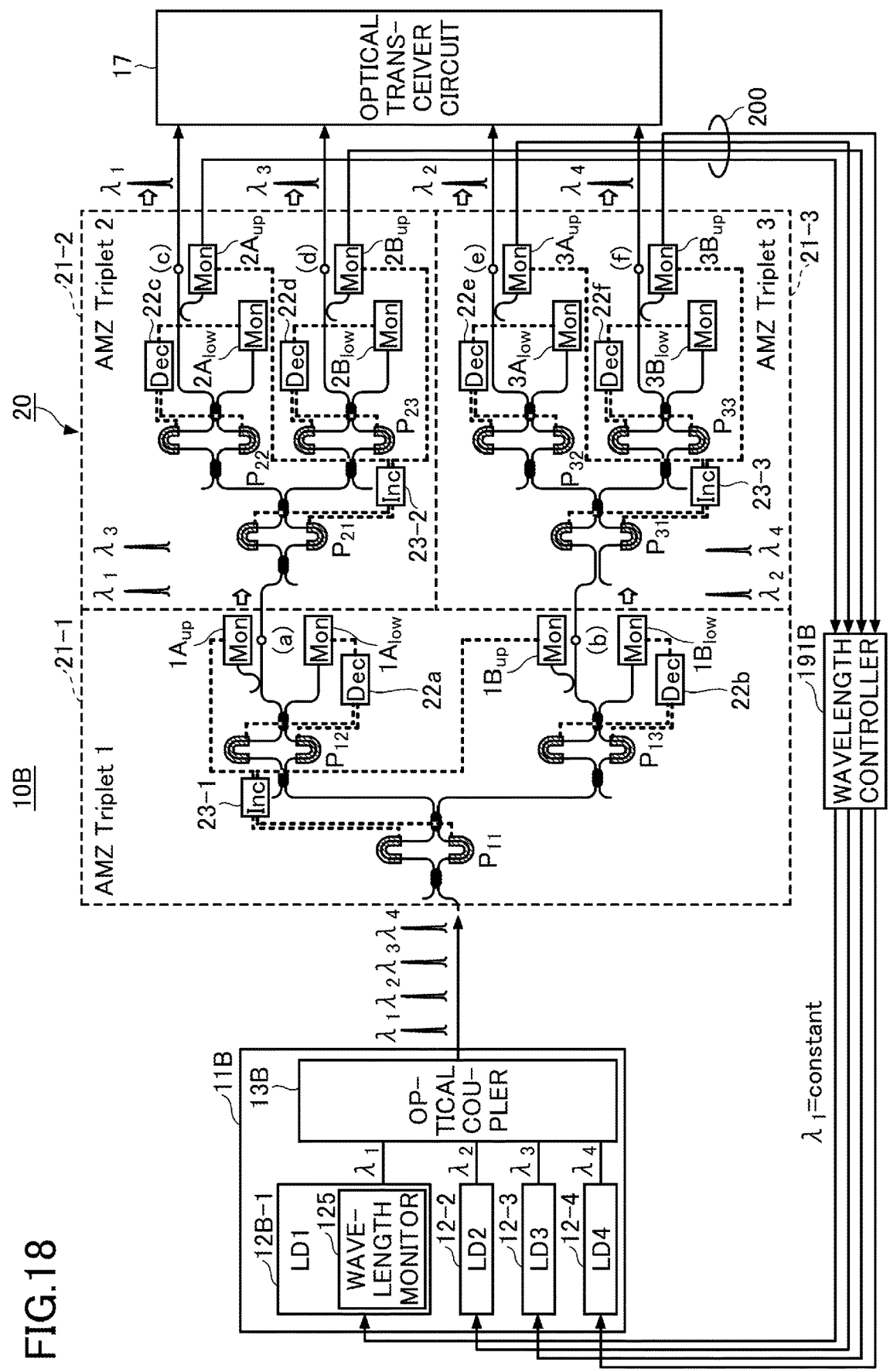
FIG. 18 is a schematic diagram of light source wavelength control using a monitoring function of the demultiplexer in FIG. 17.

FIG. 18 is a schematic diagram of light source wavelength control using a monitoring function of a demultiplexer 20. As in the first embodiment, the demultiplexer 20 is a demultiplexer having a CAT configuration. The outputs of the monitors $2A_{up}$, $2B_{up}$, $3A_{up}$, and $3B_{up}$ for controlling the transmission characteristics of the demultiplexer 20 are connected to the input of the wavelength controller 191B via the feedback signal lines 200. Based on the monitoring results, the wavelength controller 191B controls the absolute values and the wavelength spacing of the oscillation wavelengths $\lambda_1$, $\lambda_2$, $\lambda_3$, and $\lambda_4$ of the respective light source elements 12-1, 12-2, 12-3, and 12-4 of the light source device 11B.

Figure 19:
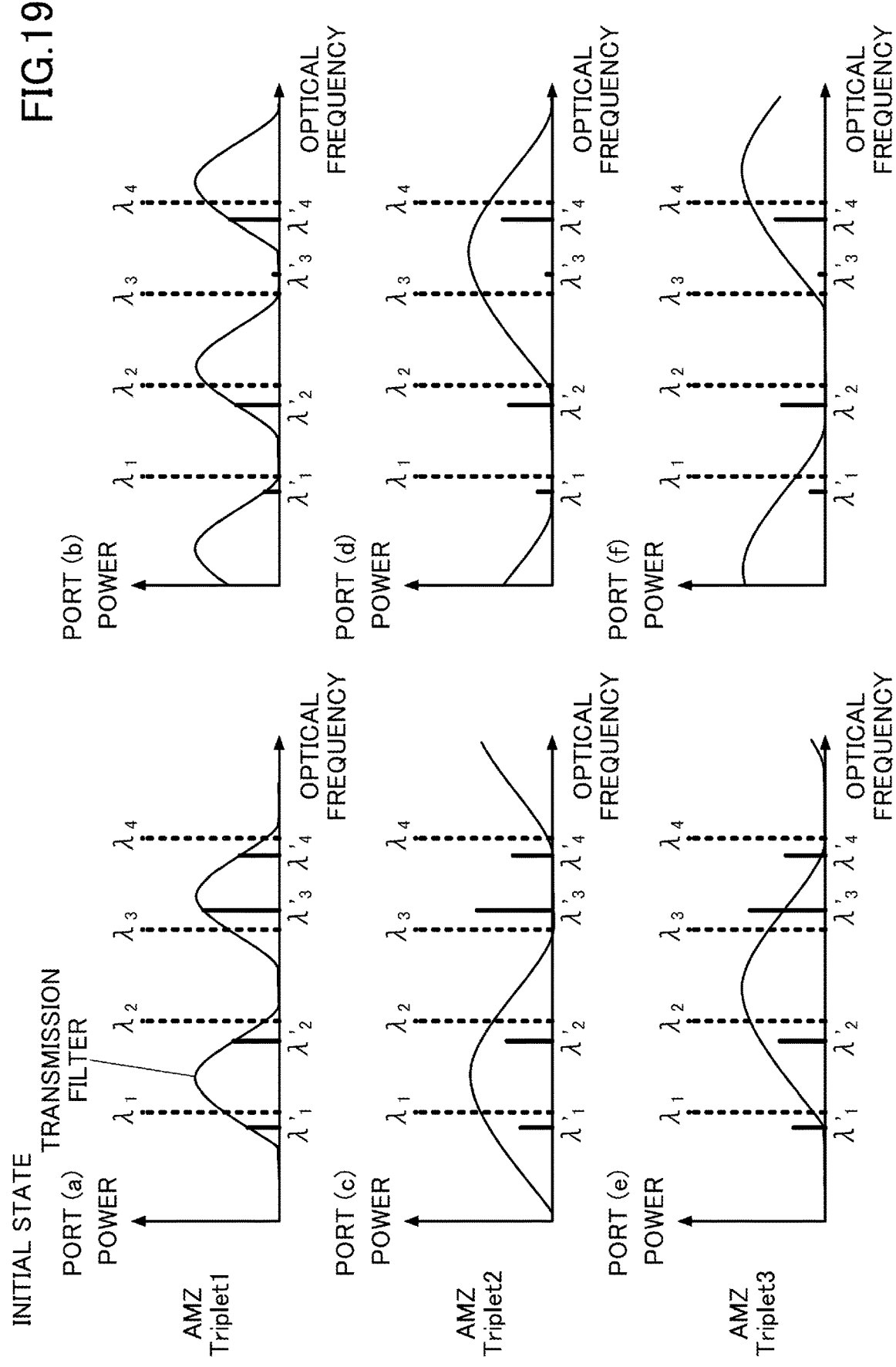
FIG. 19 is a diagram illustrating light source wavelengths in an initial state and transmission characteristics of a demultiplexer.

FIG. 19 illustrates light source wavelengths in an initial state and transmission characteristics of a demultiplexer, which illustrates respective wavelengths and transmission characteristics at ports (a), (b), (c), (d), (e), and (f) in FIG. 18. Wavelengths $\lambda_1$, $\lambda_2$, $\lambda_3$, and $\lambda_4$ indicated by dotted lines are center wavelengths of subcarriers set to have uniform spacing. $\lambda'_1$, $\lambda'_2$, $\lambda'_3$, and $\lambda'_4$ are wavelengths included in light rays output from the light source device 11B and incident on the demultiplexer 20. $\lambda'_1$, $\lambda'_2$, and $\lambda'_4$ are shifted from $\lambda_1$, $\lambda_2$, and $\lambda_4$ to the lower-frequency side (longer-wavelength side), and $\lambda'_3$ is shifted from $\lambda_3$ to the higher-frequency side (shorter-wavelength side).

Figure 20:
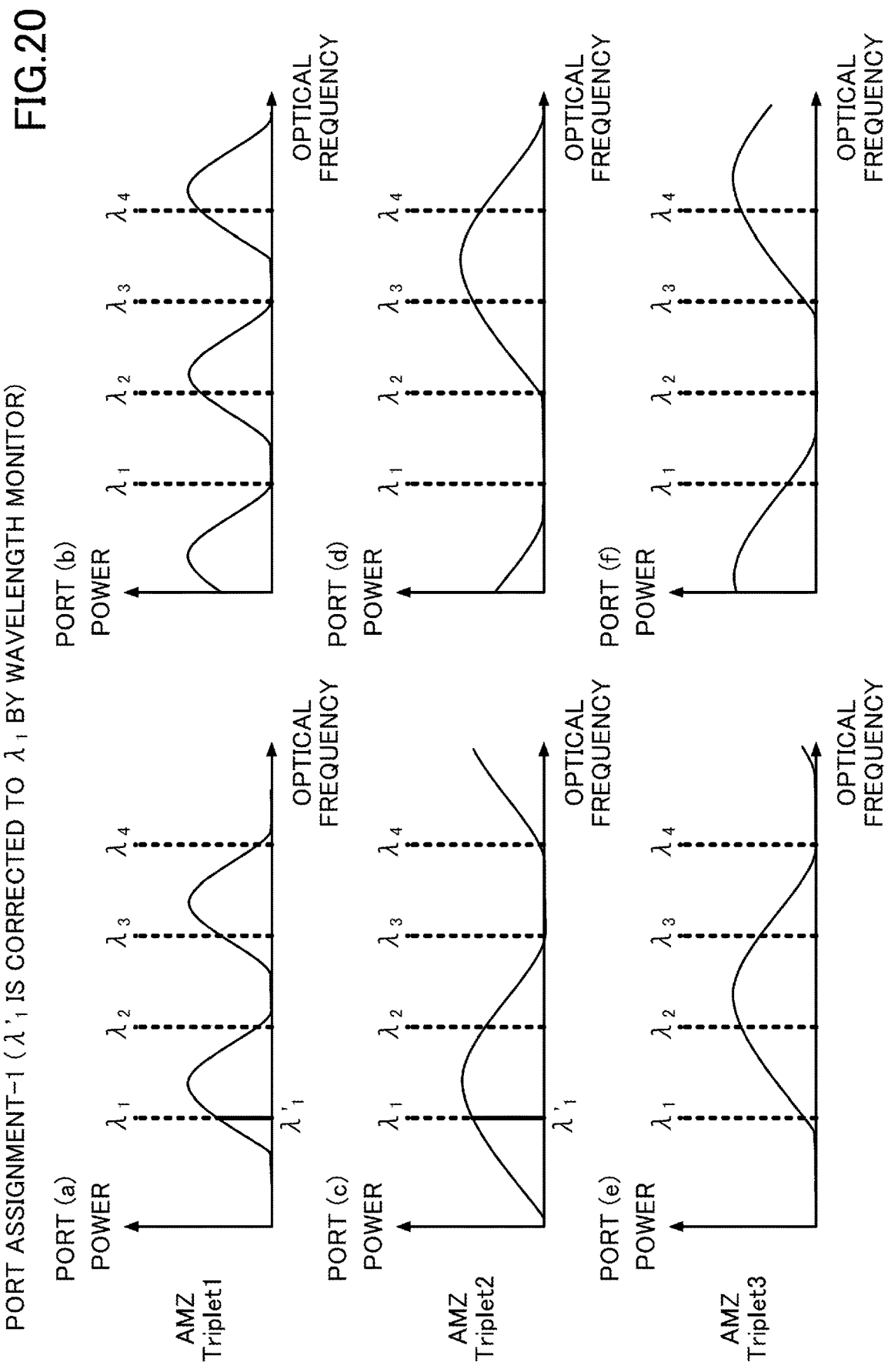
FIG. 20 is a diagram illustrating an example of assignment of wavelengths to respective ports.
Figure 21:
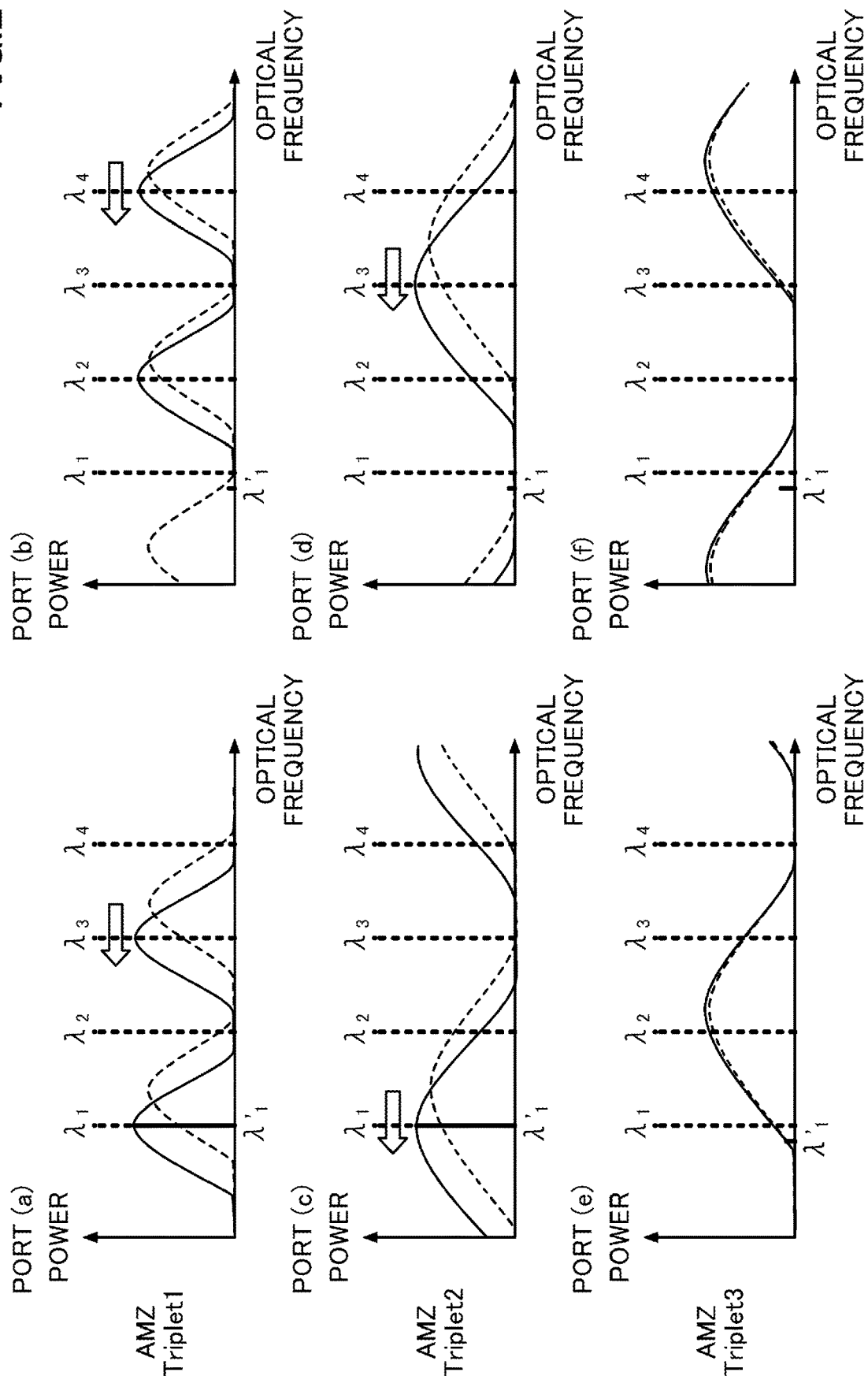
FIG. 21 is a diagram illustrating an example of assignment of wavelengths to respective ports.
Figure 22:
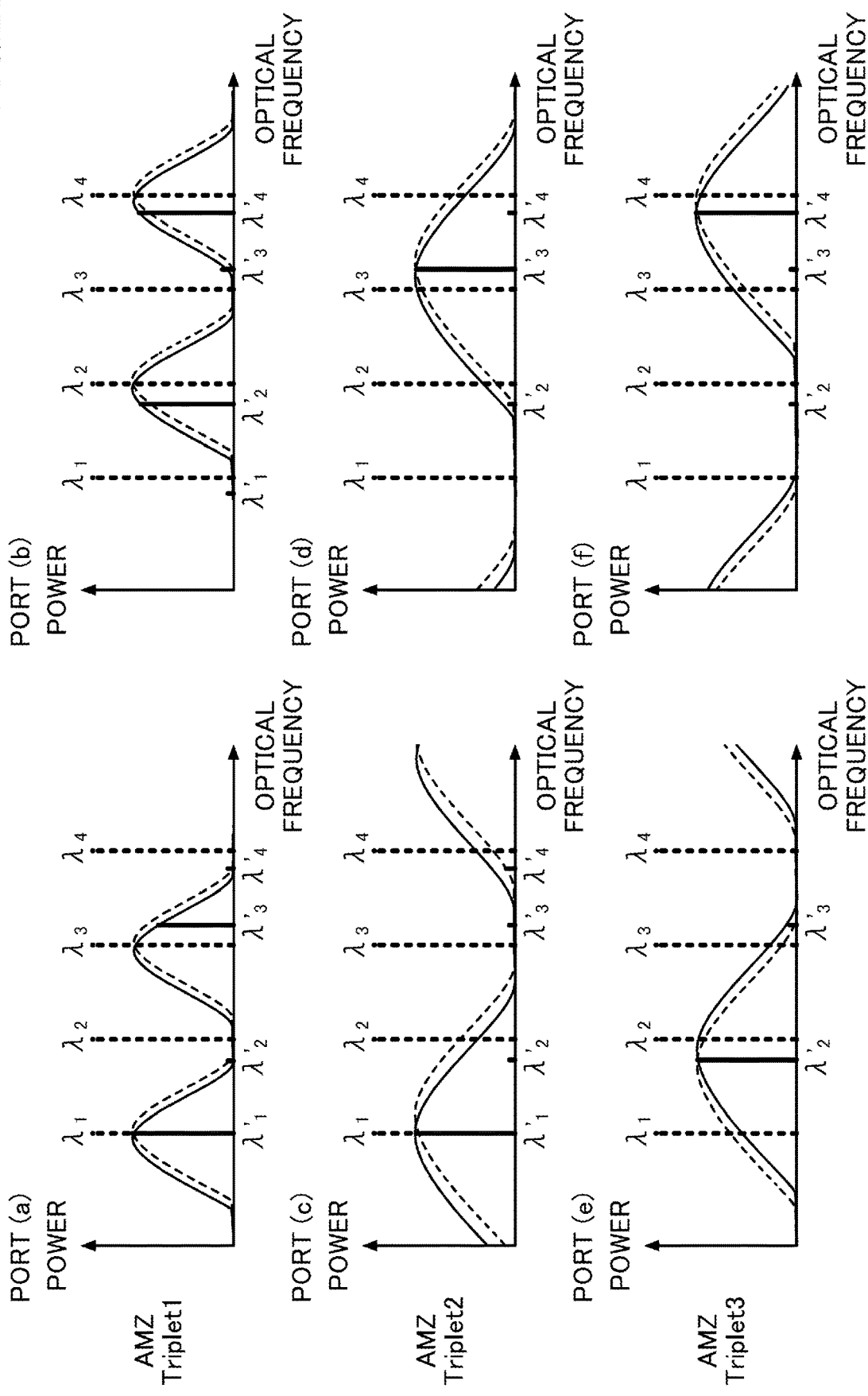
FIG. 22 is a diagram illustrating an example of assignment of wavelengths to respective ports.

FIGS. 20 to 22 illustrate examples of assignment of wavelengths to respective ports. In FIG. 20, the light source element 12-1 is turned on (activated) to make output light of the light source element 12-1 incident on the demultiplexer 20. At this time, the oscillation wavelength $\lambda'_1$ of the light source element 12-1 is fixed to $\lambda_1$ by using the wavelength monitor 125 of the light source device 11B. Although light having a wavelength $\lambda_1$ passes through the port (a) and the port (c), a peak of the transmission spectrum does not coincide with $\lambda_1$.

In FIG. 21, at the port (a), the powers $P_{11}$ and $P_{12}$ are controlled in a direction in which the monitoring result of the monitor $1A_{up}$ increases and the monitoring result of the monitor $1A_{low}$ decreases, to shift the transmission spectrum. At this time, at port (b), although there is no feedback from the monitor 1B, the transmission spectrum moves due to the influence of control of the power $P_{11}$.

At the port (c), the powers $P_{21}$ and $P_{22}$ are controlled in a direction in which the monitoring result of the monitor $2A_{up}$ increases and the monitoring result of the monitor $2A_{low}$ decreases, to shift the transmission spectrum. At this time, at port (d), although there is no feedback from the monitor 2B, the transmission spectrum moves due to the influence of control of the power $P_{21}$. There is no optical input to the unit circuit 21-3 at the ports (e) and (f); therefore, the transmission spectrum hardly changes.

Next, as in the first embodiment, the light source element 12-2 is turned on to add $\lambda'_2$. The light source elements 12-1 and 12-2 are in active states. At the ports (a) to (f), the heater power is adjusted in a direction in which the monitoring result of the monitor connected to the control circuit "Inc" increases, and the monitoring result of the monitor connected to the control circuit "Dec" decreases. Thereafter, a wavelength $\lambda'_3$ is added, and then, at the ports (a) to (f), the heater power is adjusted in a direction in which the monitoring result of the monitor connected to the control circuit "Inc" increases, and the monitoring result of the monitor connected to the control circuit "Dec" decreases.

In FIG. 22, a final wavelength $\lambda'_4$ is added to control the transmission spectrum. At the port (a), the powers $P_{11}$ and $P_{12}$ are controlled in a direction in which the monitoring result of the monitor $1A_{up}$ increases and the monitoring result of the monitor $1A_{low}$ decreases, to shift the transmission spectrum. At the port (b), the powers $P_{11}$ and $P_{13}$ of the heaters $H_{11}$ and $H_{13}$ are controlled in a direction in which the monitoring result of the monitor 1B up increases and the monitoring result of $2n$ the monitor $1B_{low}$ decreases, to shift the transmission spectrum. At the port (c), the powers $P_{21}$ and $P_{22}$ are controlled in a direction in which the monitoring result of the monitor $2A_{up}$ increases and the monitoring result of the monitor $2A_{low}$ decreases. At the port (d), the powers $P_{21}$ and $P_{23}$ are controlled in a direction in which the monitoring result of the monitor $2B_{up}$ increases and the monitoring result of the monitor $2B_{low}$ decreases. At the port (e), the powers $P_{31}$ and $P_{32}$ are controlled in a direction in which the monitoring result of the monitor $3A_{up}$ increases and the monitoring result of the monitor $3A_{low}$ decreases. At the port (f), the powers $P_{31}$ and $P_{33}$ are controlled in a direction in which the monitoring result of the monitor $3B_{up}$ increases and the monitoring result of the monitor $3B_{low}$ decreases.

In the state in FIG. 22, at each of the ports (c), (d), (e), and (f), although the wavelength coincides with a peak of the transmission spectrum, only the reference wavelength $\lambda_1$ coincides with one of the wavelengths designed to have uniform spacing. Therefore, the light source device 11B adjusts the oscillation wavelengths of the light source elements 12-2, 12-3, and 12-4 except for the light source element 12-1. The oscillation wavelength of the light source element 12-1 is locked to $\lambda_1$ by the wavelength monitor 125.

Figure 23:
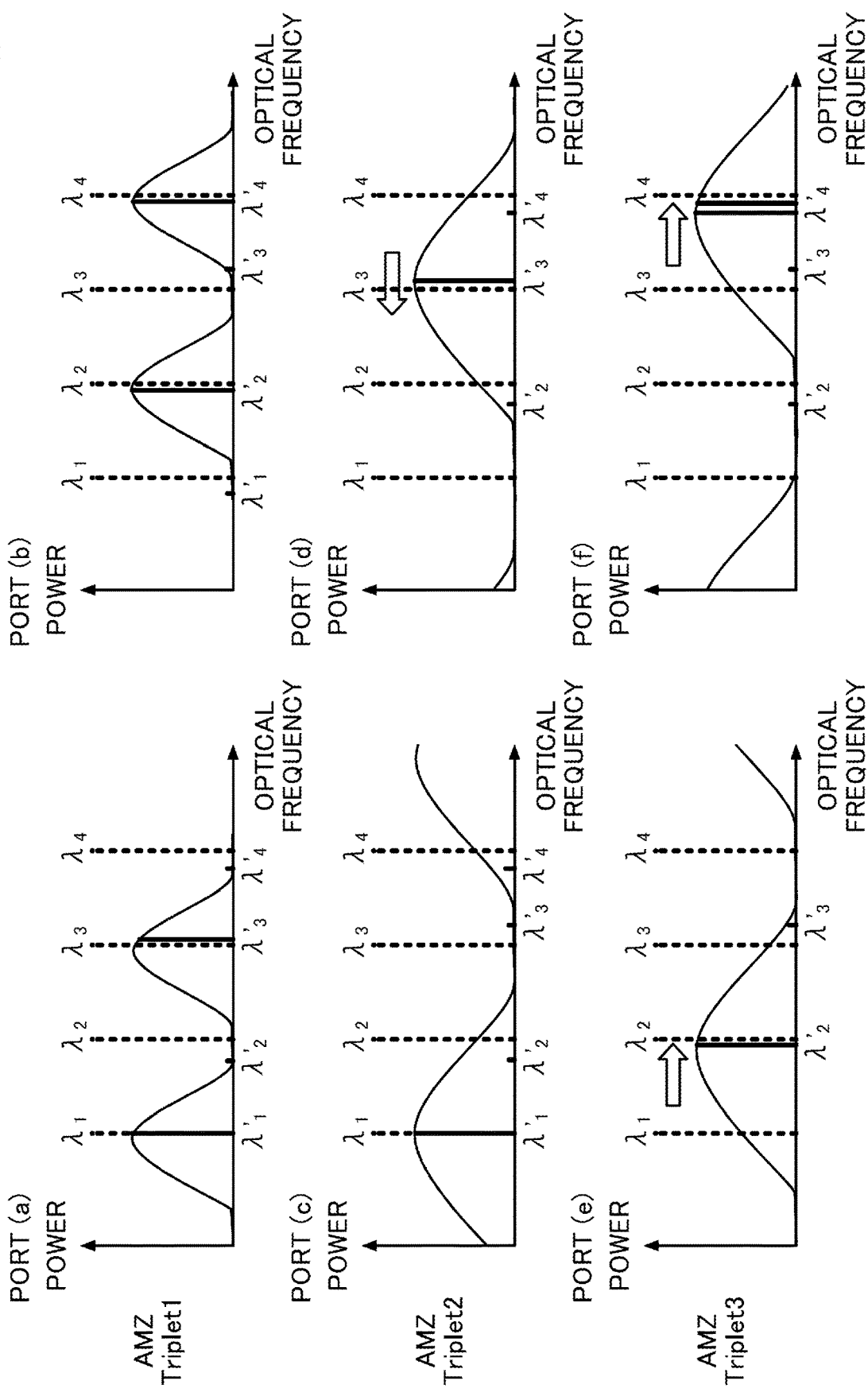
FIG. 23 is a diagram illustrating light source wavelength correction except for a reference wavelength.

FIG. 23 illustrates correction of a light source wavelength. At the port (d) of the unit circuit 21-2 of the demultiplexer 20, the oscillation wavelength $\lambda'_3$ of the light source element 12-3 is controlled in a direction in which the monitoring result of the monitor $2B_{up}$ increases and the monitoring result of the monitor $2B_{low}$ decreases. At the port (e) of the unit circuit 21-3, the oscillation wavelength $\lambda'_2$ of the light source element 12-2 is controlled in a direction in which the monitoring result of the monitor $3A_{up}$ increases and the monitoring result of the monitor $3A_{low}$ decreases. At the port (f), the oscillation wavelength $\lambda'_4$ of the light source element 12-4 is controlled in a direction in which the monitoring result of the monitor $3B_{up}$ increases and the monitoring result of the monitor $3B_{low}$ decreases.

Figure 24:
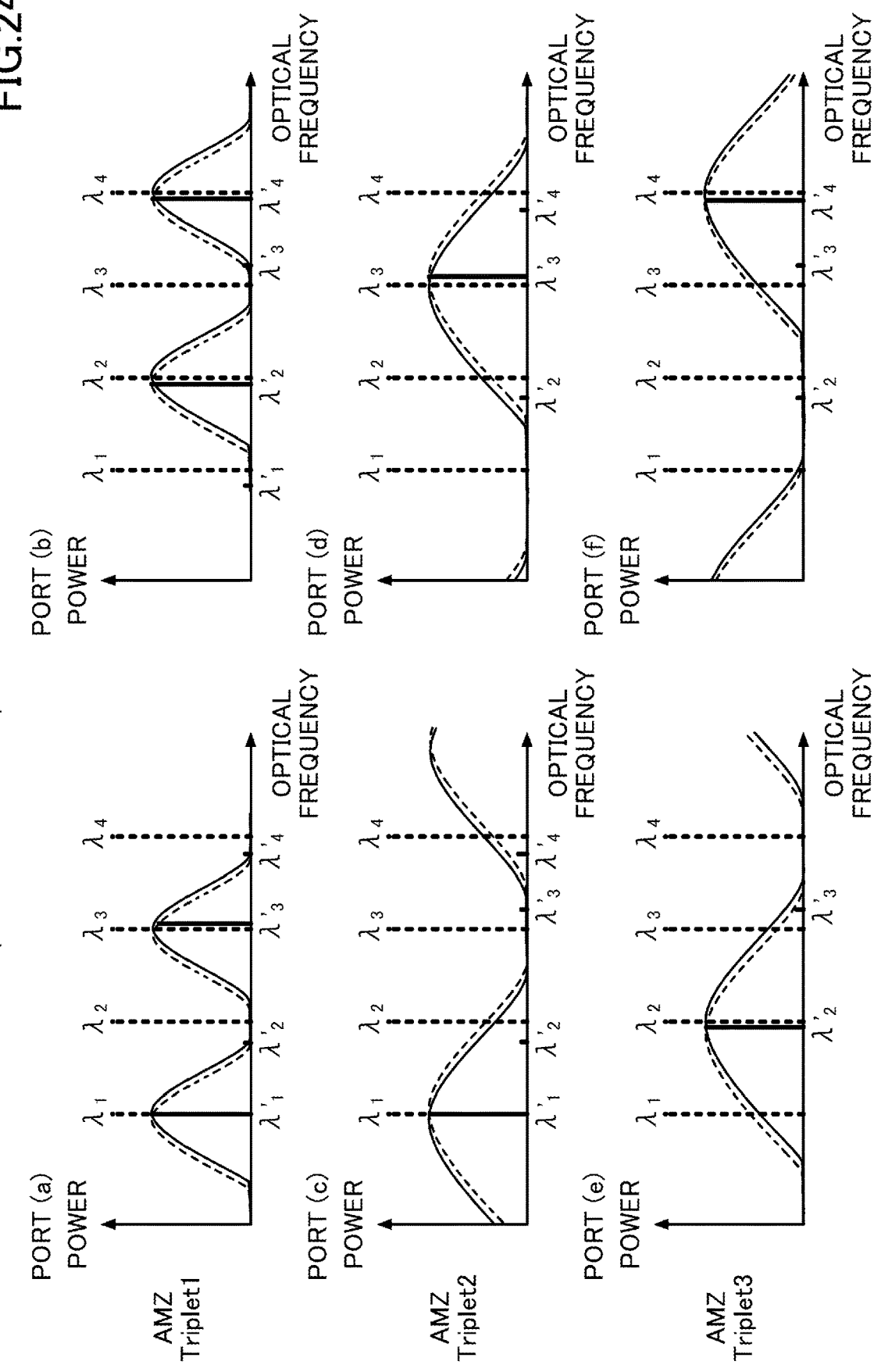
FIG. 24 is a diagram illustrating wavelength correction by heater control.

Next, in FIG. 24, again, the heaters of the demultiplexer 20 are controlled to adjust the transmission spectrum at the respective ports. At the port (a), the powers $P_{11}$ and $P_{12}$ are controlled in a direction in which the monitoring result of the monitor $1A_{up}$ increases and the monitoring result of the monitor $1A_{low}$ decreases, to shift the transmission spectrum. At the port (b), the powers $P_{11}$ and $P_{13}$ of the heaters $H_{11}$ and $H_{13}$ are controlled in a direction in which the monitoring result of the monitor $1B_{up}$ increases and the monitoring result of the monitor $1B_{low}$ decreases, to shift the transmission spectrum.

At the port (c), the powers $P_{21}$ and $P_{22}$ are controlled in a direction in which the monitoring result of the monitor $2A_{up}$ increases and the monitoring result of the monitor $2A_{low}$ decreases, to shift the transmission spectrum. At the port (d), the powers $P_{21}$ and $P_{23}$ are controlled in a direction in which the monitoring result of the monitor $2B_{up}$ increases and the monitoring result of the monitor $2B_{low}$ decreases, to shift the transmission spectrum. At the port (e), the powers $P_{31}$ and $P_{32}$ are controlled in a direction in which the monitoring result of the monitor $3A_{up}$ increases and the monitoring result of the monitor $3A_{low}$ decreases, to adjust the transmission spectrum. At the port (f), the powers $P_{31}$ and $P_{33}$ are controlled in a direction in which the monitoring result of the monitor $3B_{up}$ increases and the monitoring result of the monitor $3B_{low}$ decreases, to adjust the transmission spectrum.

Figure 25:
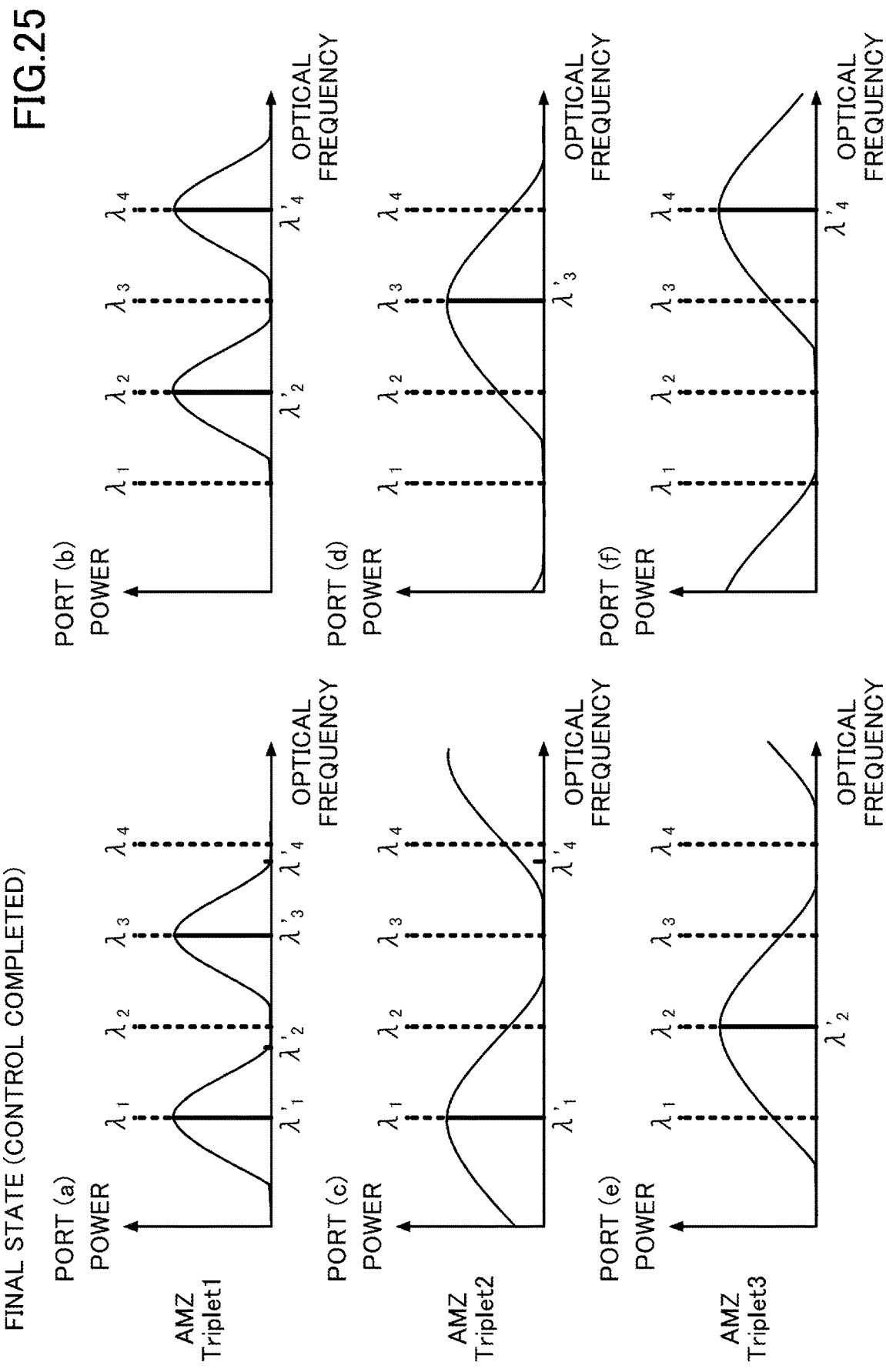
FIG. 25 is a diagram illustrating a final state of light source wavelength settings.

Next, the oscillation wavelengths $\lambda'_2$, $\lambda'_3$, and $\lambda'_4$ of the light source elements 12-2, 12-3, and 12-4 of the light source device 11B is controlled by the wavelength controller 191B again. A final state illustrated in FIG. 25 is reached by alternately repeating the correction of the oscillation wavelengths of the light source elements 12-2, 12-3, and 12-4 of the light source device 11B and the adjustment of the transmission characteristics of the demultiplexer 20. In FIG.

25, at each of the ports (c), (d), (e), and (f), light rays having respective wavelengths corresponding to the wavelengths $\lambda_1$, $\lambda_2$, $\lambda_3$, and $\lambda_4$ set to have uniform spacing pass with maximum power. Accordingly, both the uniform wavelength spacing and the absolute values of the wavelengths are realized.

Figure 26A:
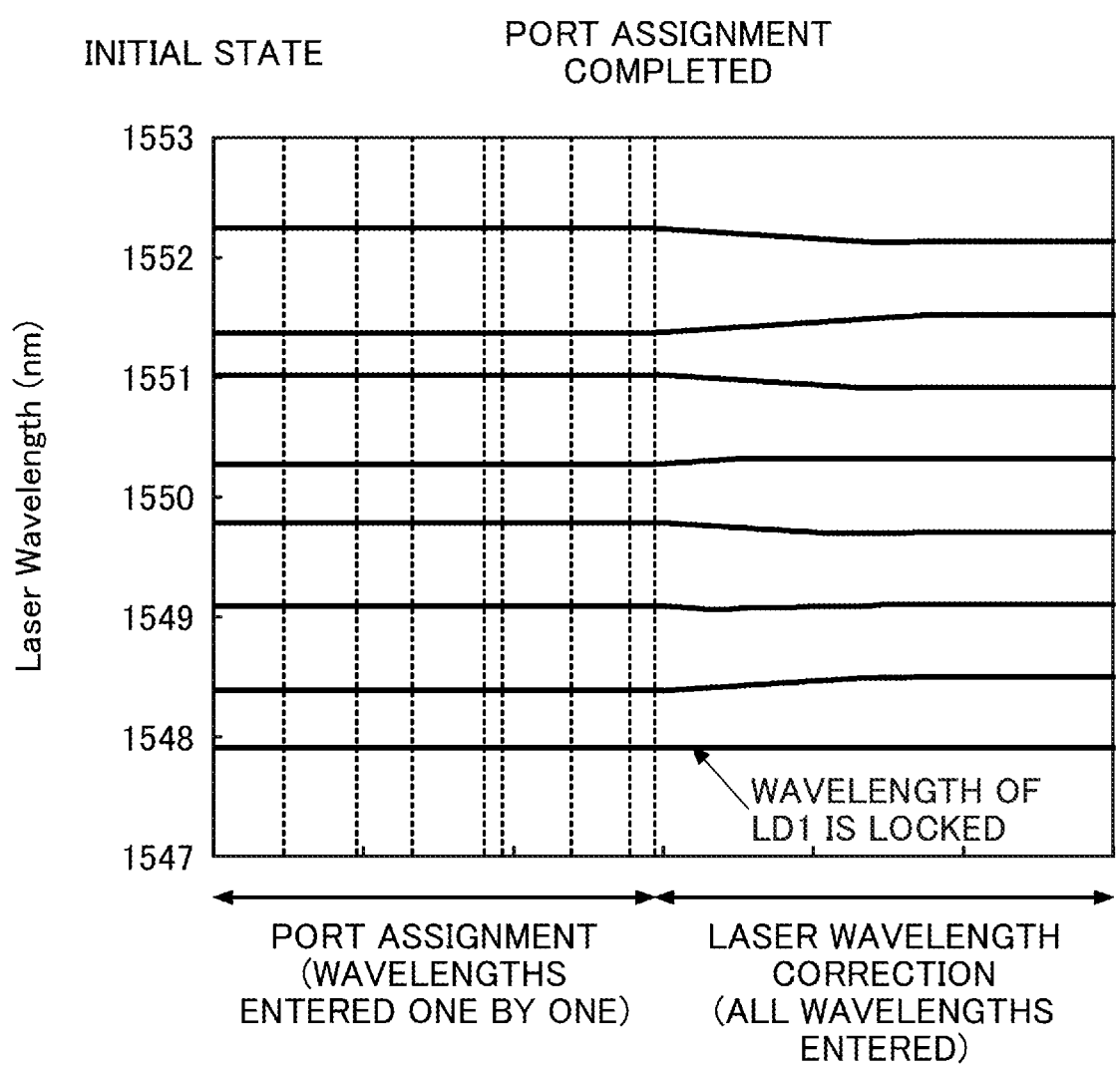
FIG. 26A is a diagram illustrating change in wavelengths during control.
Figure 26B:
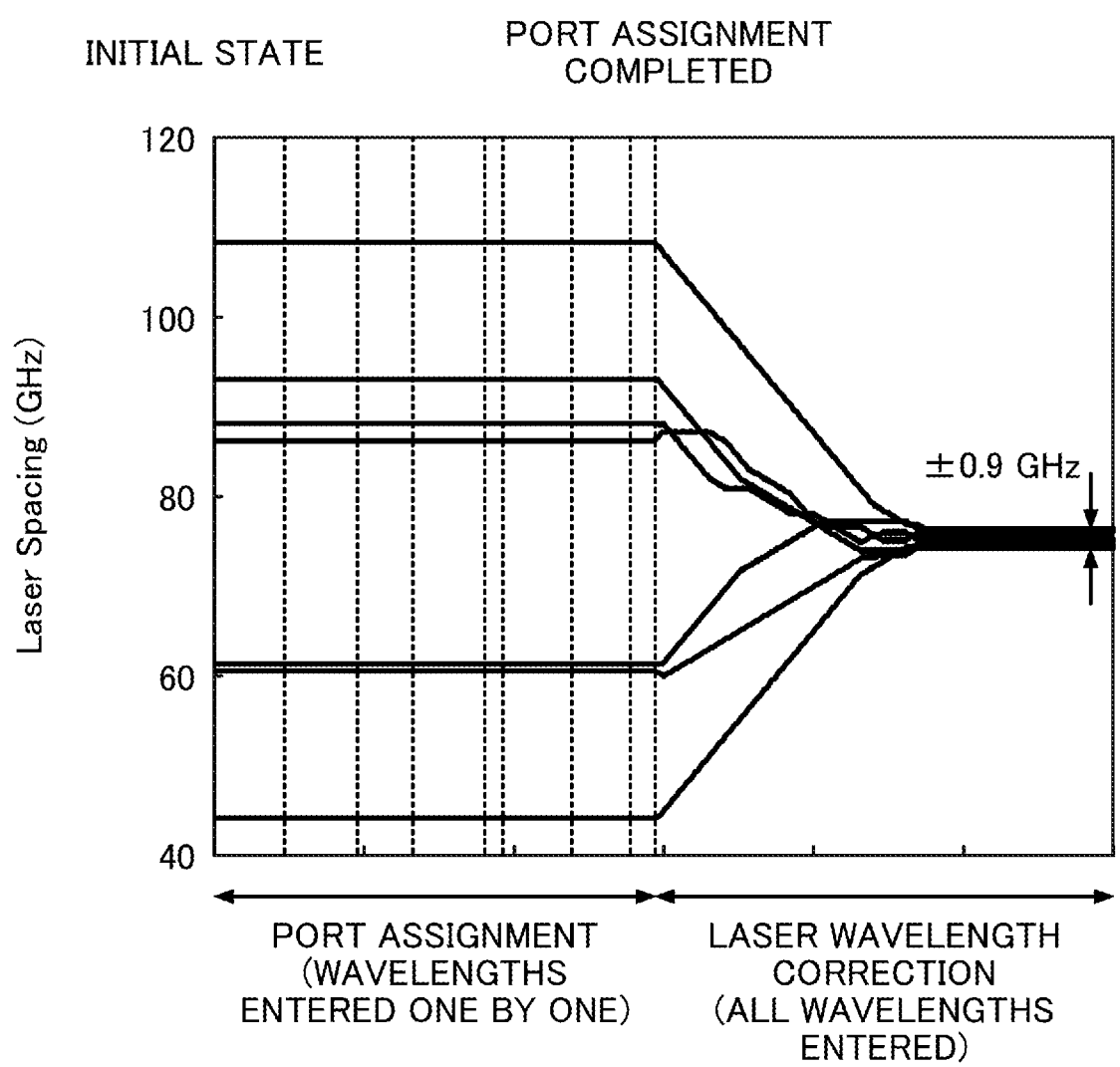
FIG. 26B is a diagram illustrating change in wavelength spacing during the course of control.

FIG. 26A illustrates changes in respective wavelengths during light source wavelength control in the second embodiment; and FIG. 26B illustrates changes in wavelength spacing during light source wavelength control. In FIGS. 26A and 26B, in the horizontal axis direction, port assignment is executed starting from the initial state, and then, light source wavelength correction is executed. In the second embodiment, the oscillation wavelength of the light source element 12-1 is locked to $\lambda_1$ by the wavelength monitor 125; therefore, the wavelength of LD1 is constant during the course of control process. After the port assignment, the oscillation wavelengths of the light source elements 12 other than the LD1 are adjusted so that the monitoring result at a port connected to one of the output waveguides of the AMZ 25 at the end of the cascaded tree increases, and the monitoring result at a port connected to the other output waveguide of the AMZ 25 decreases.

Adjustment of the light source wavelength is executed in parallel with the control of the transmission characteristics of the demultiplexer 20 based on the monitoring results existing between the input end of the demultiplexer 20 and the output port of each wavelength. Accordingly, multiple subcarriers are maintained at the absolute values of the set wavelengths and converge to the optimum states illustrated in FIGS. 26A and 26B.

In FIG. 26B, according to the control method of the embodiment, the spacing between the frequencies of light rays having eight different wavelengths converge in the vicinity of 75 GHz, and the variation is only ±0.9 GHz. As will be described later, when a wavelength monitor or a wavelength locker is provided for each light source element 12 in a general configuration to execute wavelength control, the precision of optical frequency control (variation) is ±1.5 GHz; therefore, the control precision of the embodiment is higher. In the second embodiment, the size and cost of the light source device 11B or the optical transceiver 10B can be significantly reduced while improving the use efficiency of frequencies with higher precision than conventionally achieved.

Figure 27A:
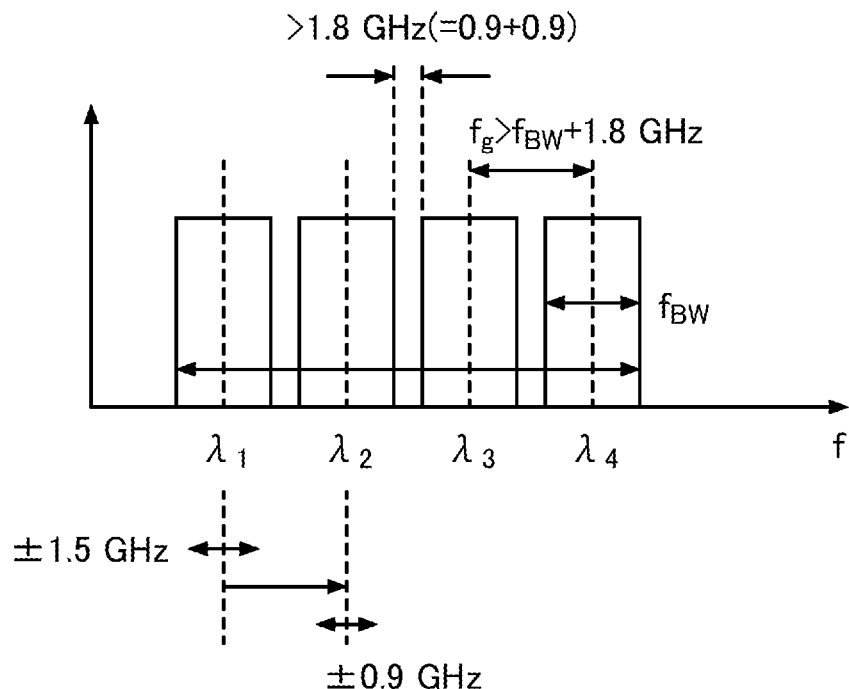
FIGS. 27A-27B are diagrams illustrating effects of the light source wavelength control of a second embodiment as compared with a comparative example.
Figure 27B:
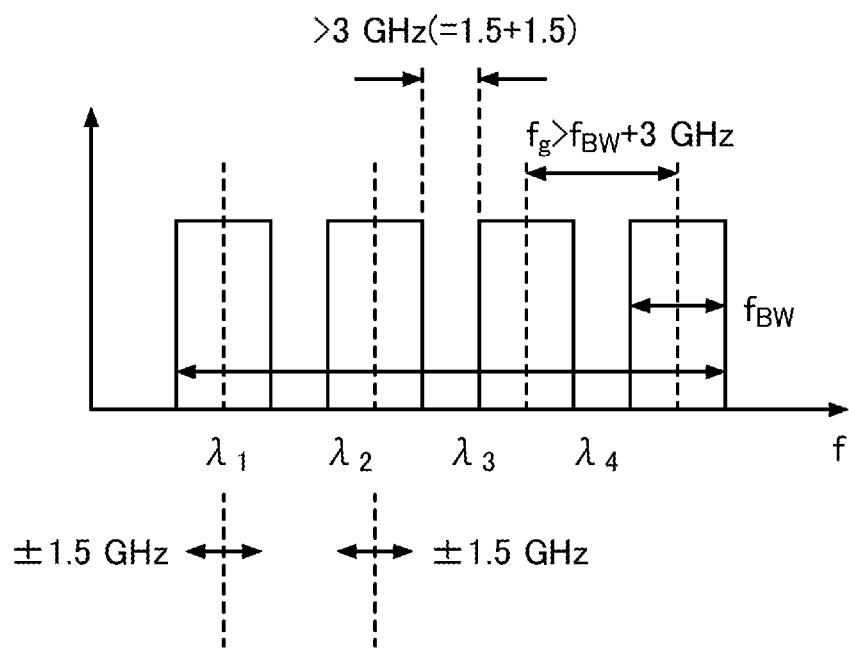

FIGS. 27A and 27B illustrate effects of the light source wavelength control of a second embodiment as compared with a comparative example. In FIG. 27A, only the oscillation wavelength $\lambda_1$ of the light source element 12-1 is locked by the wavelength monitor 125, and the other wavelengths $\lambda_2$, $\lambda_3$, and $\lambda_4$ are controlled by the wavelength controller 191B. The variation of the center wavelength of $\lambda_1$ locked by the wavelength monitor 125 is ±1.5 GHz, whereas the variation of the center wavelengths of $\lambda_2$, $\lambda_3$, and $\lambda_4$ adjusted by the method of the embodiment is 0.9 GHz. Even in the case where the center wavelengths vary in opposite directions between adjacent subcarriers (e.g., $\lambda_2$ and $\lambda_3$), the spacing is 1.8 GHz at the maximum.

In contrast, in a comparative configuration in FIG. 27B, a wavelength monitor is arranged in each light source element 12, and the oscillation wavelength of each light source element 12 is locked by the wavelength monitor. In this case, variation of 1.5 GHz occurs in all the light 3C source elements, and the spacing between adjacent subcarriers (e.g., $\lambda_2$ and $\lambda_3$) when the center wavelengths vary in opposite directions is 3 GHz at the maximum. According to the light source wavelength control of the embodiment, the optical frequency spacing of the subcarriers is uniformly and densely controlled; therefore, the use efficiency of the spectrum can be increased.

Throughout the first embodiment and the second embodiment, in the light source device 11 including the multiple light source elements 12, the spacing of the multiple wavelengths can be precisely controlled to have uniform spacing without using a wavelength monitor or a wavelength locker or using only a single wavelength monitor or wavelength locker. Accordingly, the use efficiency of frequencies can be improved, and as well, increase in the size and cost of the light source device 11 or the optical transceiver 10 can be to suppressed. The configuration and the method of controlling wavelengths of light sources of the embodiment can be applied to a configuration in which two wavelengths are demultiplexed using one unit circuit 21, a configuration in which eight wavelengths are demultiplexed by unit circuits 21 cascaded in three stages, and a configuration in which 16 wavelengths are demultiplexed by unit circuits 21 cascaded in four stages. Even in these cases, the spacing between the multiple wavelengths can also be maintained to have uniform spacing and close to each other regardless of manufacturing variation of the PIC, manufacturing variation of light source elements of a light source device, variation due to the environment, change over the years, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transceiver comprising:
an optical transceiver circuit;
a light source device configured to multiplex light rays emitted from a plurality of light source elements having different wavelengths, and output multiplexed light;
a demultiplexer configured to demultiplex the light output from the light source device into a plurality of wavelengths to supply the wavelengths to the optical transceiver circuit;
a plurality of monitors configured to individually monitor any one of the plurality of wavelengths at output ports of the demultiplexer; and
a wavelength controller including processing circuitry configured to control the wavelengths of the plurality of light source elements, based on monitoring results of the monitors,
wherein the demultiplexer includes a plurality of unit circuits in each of which three asymmetric Mach-Zehnder interferometers having a predetermined arm length difference are connected in a tree shape, the plurality of unit circuits being cascaded in the tree shape, and each of the monitors being arranged at an output waveguide of an asymmetric Mach-Zehnder interferometer at an end of the cascaded tree, to be connected to the wavelength controller via a signal line.

2. The optical transceiver as claimed in claim 1, wherein the light source device includes a wavelength monitor or a wavelength locker only for a first light source element among the plurality of light source elements, and wherein the wavelength controller fixes a wavelength of the first light source element by the wavelength monitor or the wavelength locker, and controls the wavelengths of the light source elements except for the first light source element, based on monitoring results.

3. The optical transceiver as claimed in claim 2, wherein the wavelength controller controls the wavelengths of the plurality of light source elements so as to make the plurality of wavelengths have predetermined absolute values and uniform spacing.

4. The optical transceiver as claimed in claim 1, wherein the wavelength controller controls the wavelengths of the plurality of light source elements so as to make the plurality of wavelengths have uniform spacing.

5. The optical transceiver as claimed in claim 1, wherein the output waveguide of the asymmetric Mach-Zehnder interferometer at the end is bifurcated,
wherein the demultiplexer includes a first monitor connected to one output waveguide of the asymmetric Mach-Zehnder interferometer at the end, and configured to monitor light having a corresponding wavelength, and a second monitor connected to another output waveguide, and
wherein the wavelength controller controls the wavelengths of the plurality of light source elements in a direction in which a first monitoring result of the first monitor increases and a second monitoring result of the second monitor decreases.

6. The optical transceiver as claimed in claim 5, wherein the demultiplexer includes a control mechanism configured to control transmission characteristics of the demultiplexer, based on a first monitoring result and a second monitoring result, and
wherein the wavelength controller controls the wavelengths of the plurality of light source elements in parallel with the control of the transmission characteristics by the control mechanism.

7. The optical transceiver as claimed in claim 6, wherein the control mechanism includes a first control circuit configured to control the effective optical path length of the head asymmetric Mach-Zehnder interferometer of the unit circuit including the terminal asymmetric Mach-Zehnder interferometer so that the first monitoring result increases, and a second control circuit configured to control the effective optical path length of the terminal asymmetric Mach-Zehnder interferometer so that the second monitoring result decreases.

8. An optical transceiver device for subcarrier transmission, comprising:
an optical transceiver that includes
an optical transceiver circuit;
a light source device configured to multiplex light rays emitted from a plurality of light source elements having different wavelengths, and output multiplexed light;
a demultiplexer configured to demultiplex the light output from the light source device into a plurality of wavelengths to supply the wavelengths to the optical transceiver circuit;
a plurality of monitors configured to individually monitor any one of the plurality of wavelengths at output ports of the demultiplexer; and
a wavelength controller including processing circuitry configured to control the wavelengths of the plurality of light source elements, based on monitoring results of the monitors,
wherein the demultiplexer includes a plurality of unit circuits in each of which three asymmetric Mach-Zehnder interferometers having a predetermined arm length difference are connected in a tree shape, the plurality of unit circuits being cascaded in the tree shape, and each of the monitors being arranged at an output waveguide of an asymmetric Mach-Zehnder interferometer at an end of the cascaded tree, to be connected to the wavelength controller via a signal line.

9. A method of controlling light source wavelengths, the method comprising:
preparing a light source device having a plurality of light source elements having different wavelengths;
having light including a plurality of wavelengths from the light source device incident on a demultiplexer, the demultiplexer to supply the plurality of wavelengths to an optical transceiver circuit, the demultiplexer including a plurality of unit circuits cascaded in a tree shape, each of the unit circuits including three asymmetric Mach-Zehnder interferometers having a predetermined arm length difference connected in a tree shape;
monitoring light rays of the plurality of wavelengths demultiplexed by the demultiplexer at output ports of the demultiplexer; and
controlling the wavelengths of the plurality of light source elements by a wavelength controller, based on monitoring results.

10. The method of controlling light source wavelengths as claimed in claim 9, the method further comprising:
fixing a first wavelength of a first light source element among the plurality of light source elements; and
controlling the wavelengths of the light source elements except for the first light source element by the wavelength controller.

11. The method of controlling light source wavelengths as claimed in claim 10, wherein oscillation wavelengths of the plurality of light source elements is controlled by the wavelength controller, so as to make the plurality of wavelengths have predetermined absolute values and uniform spacing.

12. The method of controlling light source wavelengths as claimed in claim 9, wherein oscillation wavelengths of the plurality of light source elements is controlled by the wavelength controller, so as to make the plurality of wavelengths have uniform spacing.

13. The method of controlling light source wavelengths as claimed in claim 9, wherein a first monitor configured to monitor light having a corresponding wavelength is connected to one of two output waveguides of an asymmetric Mach-Zehnder interferometer at an end of a cascaded tree, and a second monitor is connected to another waveguide, and
wherein the wavelength controller controls the oscillation wavelength of the corresponding light source element in a direction in which a first monitoring result of the first monitor increases and a second monitoring result of the second monitor decreases.

* * * * *